United States Patent
Adams et al.

(10) Patent No.: US 11,911,651 B1
(45) Date of Patent: Feb. 27, 2024

(54) SYSTEM, DEVICE AND METHOD FOR ELECTRONICALLY MEDIATED UPPER EXTREMITY THERAPY

(71) Applicant: Barron Associates, Inc., Charlottesville, VA (US)

(72) Inventors: Richard J. Adams, Punta Gorda, FL (US); William T. Gressick, Charlottesville, VA (US); Aaron B. Olowin, Charlottesville, VA (US); Matthew Lichter, Charlottesville, VA (US)

(73) Assignee: Barron Associates, Inc., Charlottesville, VA (US)

( * ) Notice: Subject to any disclaimer, the term of this patent is extended or adjusted under 35 U.S.C. 154(b) by 0 days.

(21) Appl. No.: 18/232,581

(22) Filed: Aug. 10, 2023

(51) Int. Cl.
| | |
|---|---|
| *G06F 3/041* | (2006.01) |
| *G06F 3/01* | (2006.01) |
| *G06F 3/0346* | (2013.01) |
| *A63B 22/00* | (2006.01) |
| *A63B 24/00* | (2006.01) |
| *A63B 71/06* | (2006.01) |

(52) U.S. Cl.
CPC ...... *A63B 22/0005* (2015.10); *A63B 24/0062* (2013.01); *A63B 71/0622* (2013.01); *G06F 3/011* (2013.01); *G06F 3/016* (2013.01); *G06F 3/0346* (2013.01); *G06F 3/041* (2013.01); *A63B 2022/0094* (2013.01); *A63B 2024/0096* (2013.01); *A63B 2071/0638* (2013.01); *A63B 2071/0655* (2013.01); *A63B 2220/58* (2013.01); *A63B 2220/833* (2013.01)

(58) Field of Classification Search
CPC ........ A63B 22/0005; A63B 2022/0094; A63B 2024/0096; A63B 2071/0638; G06F 3/011; G06F 3/016
See application file for complete search history.

(56) References Cited

U.S. PATENT DOCUMENTS

| | | |
|---|---|---|
| 5,577,981 A | 11/1996 | Jarvik |
| 7,635,324 B2 | 12/2009 | Balis |
| 9,333,427 B2 | 5/2016 | Sabo et al. |

(Continued)

FOREIGN PATENT DOCUMENTS

| | | |
|---|---|---|
| WO | 2016140924 | 9/2016 |
| WO | 2017171476 | 10/2017 |

(Continued)

*Primary Examiner* — Michael J Jansen, II
*Assistant Examiner* — Sosina Abebe
(74) *Attorney, Agent, or Firm* — Williams Mullen; Thomas F. Bergert

(57) ABSTRACT

Embodiments of the presently described device, system and method support upper extremity therapy through a control device. In various embodiments, the control device is provided as a central hub with atomic elements extending outwardly thereof, and the control device can incorporate a movement interpretation circuit, a touch detection circuit and/or one or more sensory transducers. In various embodiments, the control device is interoperable with a valence, an external computing device and a display device. Embodiments of the external computing device are operable to render a graphical depiction of simulated objects in a virtual world upon receiving a transmission of sensed human grasping of one or more atomic elements.

20 Claims, 22 Drawing Sheets

(56) References Cited

U.S. PATENT DOCUMENTS

| | | |
|---|---|---|
| 10,004,660 B2 | 6/2018 | Hobbs et al. |
| 10,349,869 B2 | 7/2019 | Hover et al. |
| 10,632,368 B2 | 4/2020 | Fujita |
| 11,696,633 B1* | 7/2023 | Parazynski ............ F16M 13/04 24/3.2 |
| 2006/0287617 A1 | 12/2006 | Tuab et al. |
| 2007/0171194 A1* | 7/2007 | Conti ...................... G06F 3/011 345/156 |
| 2007/0265146 A1 | 11/2007 | Kowalczewski et al. |
| 2011/0050405 A1* | 3/2011 | Hollis, Jr. ............... G06F 3/016 340/407.2 |
| 2014/0081661 A1 | 3/2014 | Fu et al. |
| 2016/0139669 A1* | 5/2016 | Cambridge ............ G06F 3/014 345/158 |
| 2018/0228434 A1 | 8/2018 | Dwarika et al. |
| 2018/0267667 A1* | 9/2018 | De Araujo ............. G06F 3/017 |
| 2018/0356907 A1* | 12/2018 | Parazynski ............ G06F 3/014 |
| 2019/0025869 A1* | 1/2019 | Parazynski .............. G05G 1/02 |
| 2019/0201784 A1* | 7/2019 | Holz ...................... G06F 3/0338 |
| 2019/0269962 A1 | 9/2019 | King et al. |
| 2020/0197826 A1* | 6/2020 | Zhang ................ G05G 9/04796 |
| 2020/0222265 A1 | 7/2020 | Ali |
| 2020/0387239 A1* | 12/2020 | Parazynski .............. G05G 1/01 |
| 2020/0393922 A1 | 12/2020 | Neitfeld |
| 2021/0173391 A1* | 6/2021 | Parazynski ........... G05D 1/101 |
| 2021/0365106 A1* | 11/2021 | Horii ...................... G06F 3/033 |
| 2022/0291708 A1* | 9/2022 | Parazynski ............ G05G 5/065 |

FOREIGN PATENT DOCUMENTS

| | | |
|---|---|---|
| WO | 2018140802 | 8/2018 |
| WO | 2019122885 | 4/2019 |

* cited by examiner

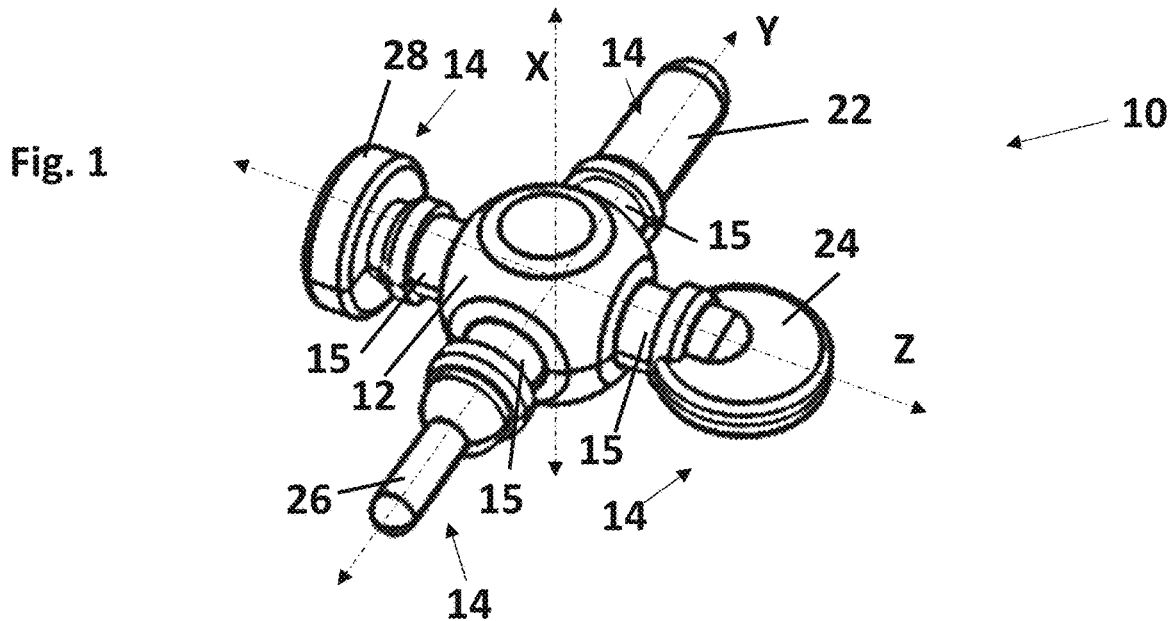
Fig. 1
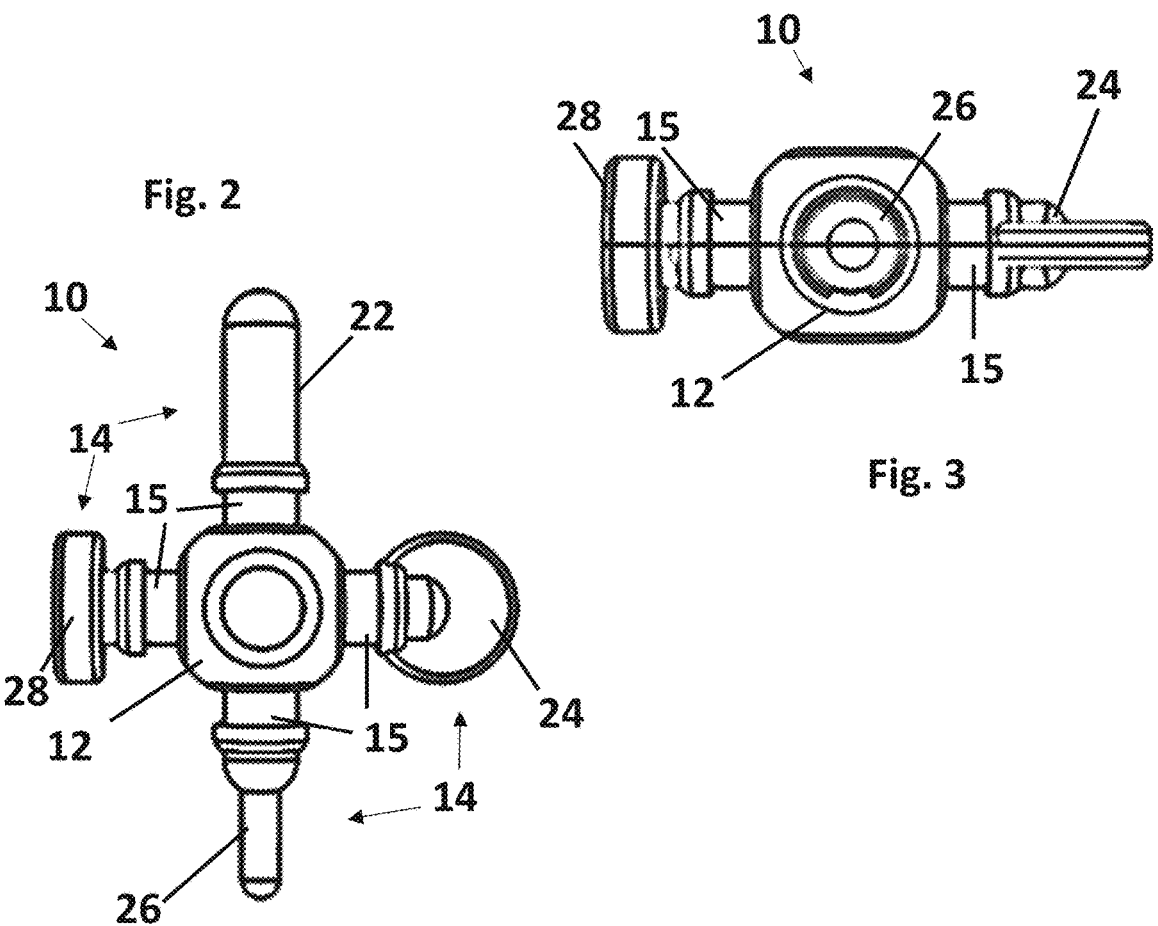
Fig. 2
Fig. 3

Fig. 8
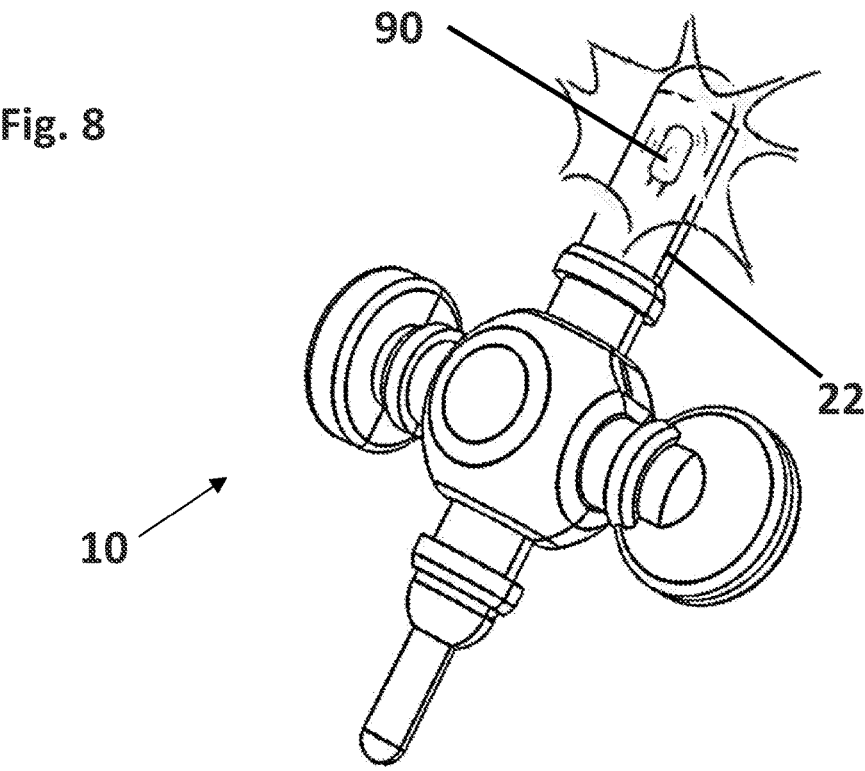
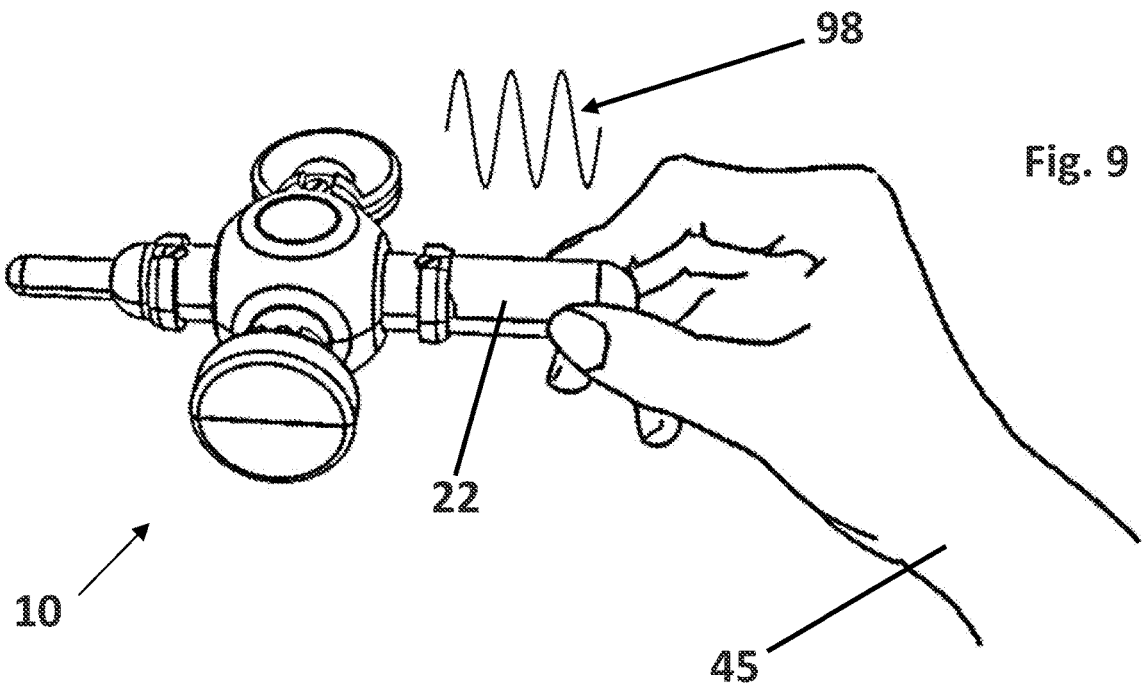
Fig. 9

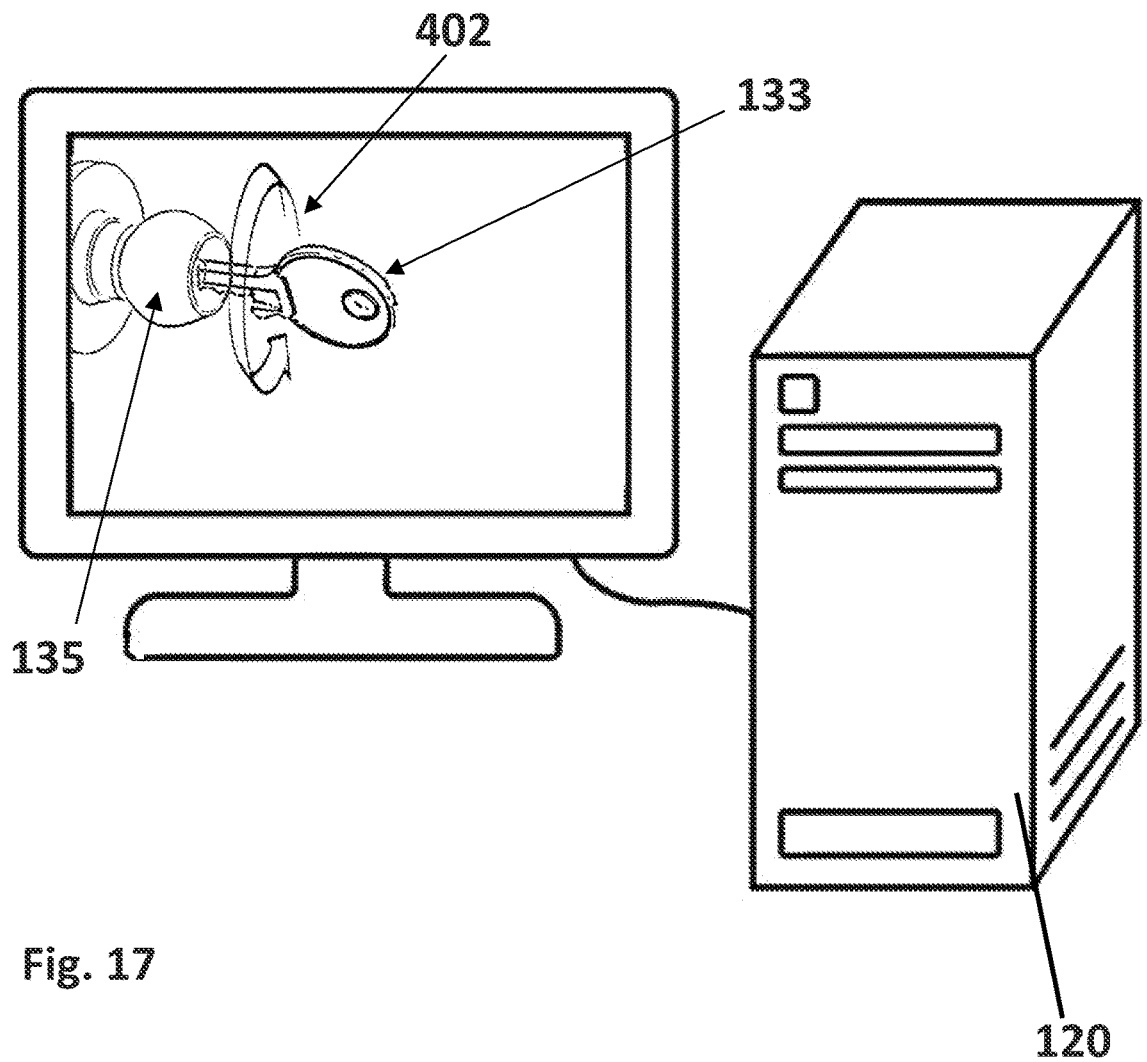
Fig. 17
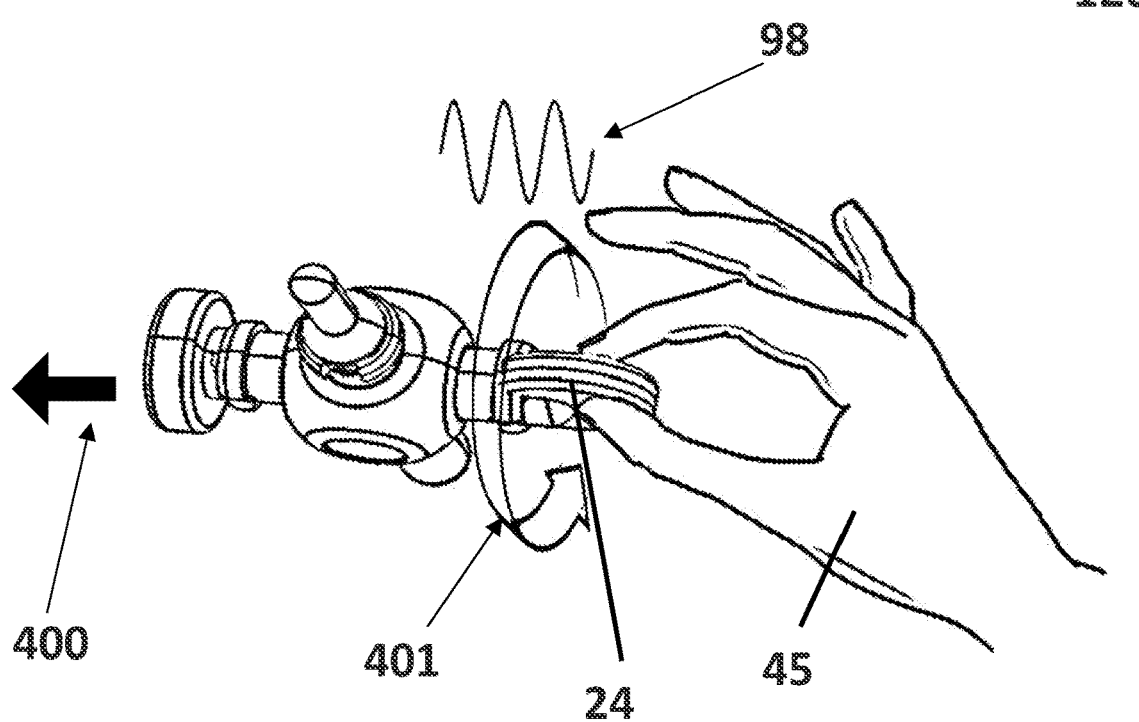

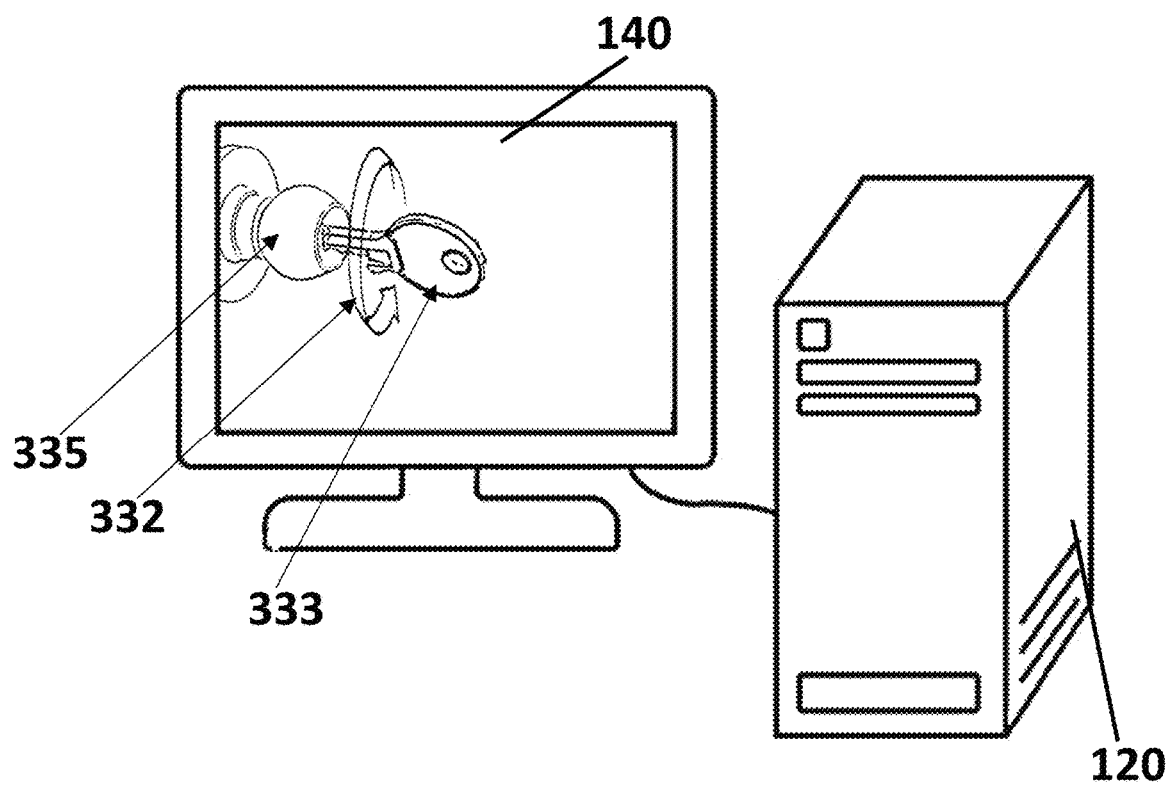
Fig. 32
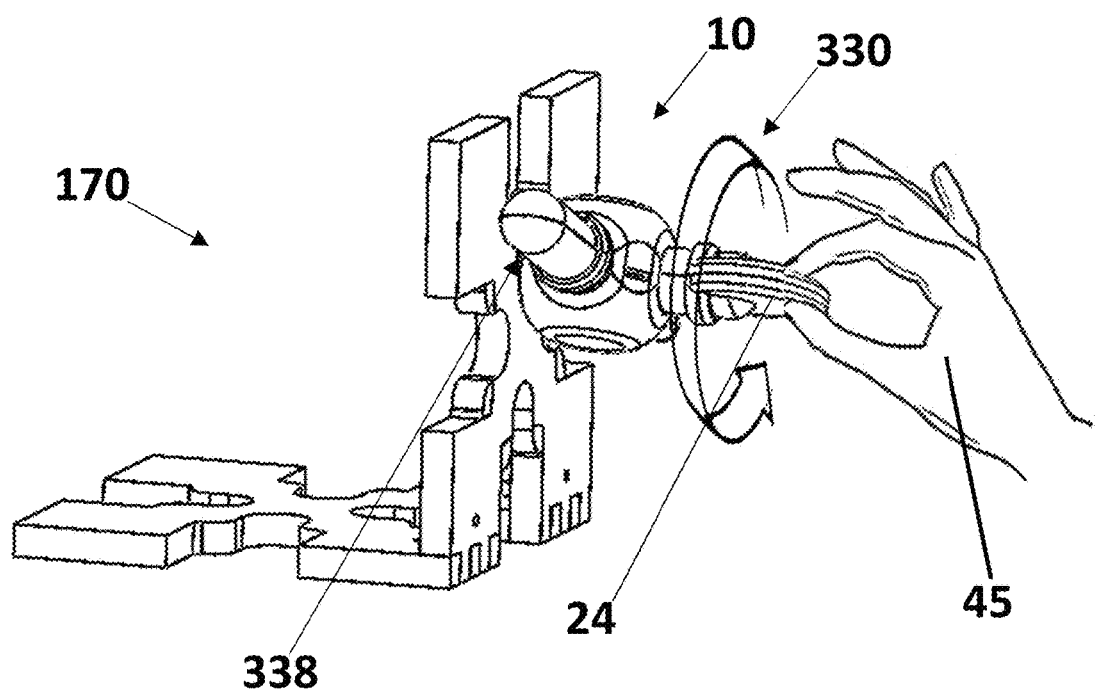

SYSTEM, DEVICE AND METHOD FOR ELECTRONICALLY MEDIATED UPPER EXTREMITY THERAPY

STATEMENT

This invention was made with U.S. Government support under grant no. 1R43HD092169-02A1 awarded by the Eunice Kennedy Shriver National Institute of Child Health & Human Development. The Government has certain rights in the invention.

TECHNICAL FIELD

The present disclosure pertains to therapeutic physical rehabilitation, and more particularly to a system, device and method for electronically mediated therapeutic exercise adapted for victims of upper extremity (UE) partial paralysis.

BACKGROUND

Hemiplegia is a partial paralysis or weakness of one side of the body that impairs the use of the UE on the affected side and disrupts motor functions essential to self-care, play, exploratory learning, and daily activities. Causes of pediatric hemiplegia encompass any injury or illness associated with the brain, including cerebral palsy (CP), cerebral vascular accident (stroke), traumatic brain injury, brain tumor, or other illness. CP impacts more than 1 in 300 children, with disproportionate prevalence in minority and economically disadvantaged populations. The majority of children with hemiplegia experience some level of impairment in UE function, which often include reduced range of motion, weakness, and poor coordination in use of the arm and hand. When considering alternate approaches to UE rehabilitation, higher duration and intensity of training is associated with better outcomes over usual care. Neuroplasticity provides one explanation for why increased dosage and intensity produces superior outcomes over usual care. Emerging evidence in studies involving children with hemiplegia mirrors findings in stroke research that frequent, longer-duration interventions improve cortical activation and neuroplasticity, and therefore lead to better outcomes.

Unfortunately, due to high cost and human resource constraints, when intensive regimes are available in clinical practice, the dosage achieved in therapy is typically much less than what research evidence indicates is necessary to achieve positive change in UE function. Intensive therapy regimes strain the capacity and resources of delivery systems and challenge the ability of individual therapists to maintain patient engagement. Therapists face a formidable challenge in keeping patients motivated through the more frequent and longer practice sessions. Both children and adults can quickly become bored with repetitive exercise assignments.

Virtual worlds-based computer games and other electronic games can provide a means to maintain patient engagement while delivering high-dosage evidence-based rehabilitation. A critical deficiency in existing computer game-based solutions for UE therapy is that they do not adequately address the need for practice of dexterous manual interaction with real-world physical objects. This is a particular concern for children with hemiplegia, who often suffer from hand function deficits.

BRIEF SUMMARY

The present disclosure addresses the above and other technological challenges. In part, the present disclosure provides a device, system, and method to engage a patient in computer-mediated therapeutic exercise by employing a specially designed control device and a corresponding representation of this control device in a virtual world, which can be called an avatoy in accordance with embodiments of the present disclosure. Embodiments of the control device provide geometric forms operatively configured to be held by the human hand, a touch detection and movement interpretation circuit with one or more sensing transducers operatively configured to transmit information on human touch and the movement of the control device to a computer, and one or more sensory output transducers operatively configured to provide feedback to a user regarding interactions with an electronically associated event, such as interactions between an avatoy and other simulated objects in a virtual world. Embodiments as disclosed herein provide programming that elicits therapeutic UE movements involving the arm and dexterous manual manipulation of the control device using the hand. To elicit different human grasp interactions, the control device can be operatively configured with one or more physical protrusions (which may be referred to as "atoms") that can have geometric shapes that correspond to certain grasp modalities. In certain exemplary embodiments, a control device's geometric form may comprise a central hub with four atoms. In certain exemplary embodiments, the shapes of the control device's four atoms may include a disk shape corresponding to a lateral pinch grasp; a stylus shape corresponding to a tripod precision grasp; a knob shape corresponding to a spherical grasp; and a cylinder shape corresponding to a tool/wrap power grasp.

In certain exemplary embodiments, the atoms can be interchangeable, allowing the control device to be operatively adapted to support a wider array of grasp interactions. In certain exemplary embodiments, a large cylindrical atom may be used to elicit a cylindrical power grasp by a user. In an alternative exemplary embodiment, a large spherical atom may be used to elicit a spherical power grasp by a user.

In various embodiments, an external computing device is operatively configured to, among other things, graphically present movement of an avatoy on a display device corresponding to the movement of the control device grasped by a human hand using an atom. In various embodiments, the form of the avatoy changes as determined by human touch or grasp of one or a unique combination of atoms on the control device. In certain exemplary embodiments, an avatoy can be a virtual tool that is used to interact with other simulated objects in functional tasks within a virtual world. In certain exemplary embodiments, the avatoy can be a key, a hammer, a screwdriver, a firefly net, a magic wand, a fishing pole, a ping pong paddle, or a water blaster, for example. In certain exemplary embodiments, other simulated objects may be a doorknob, a nail, a screw, a firefly, a fish, a dragon, a ball, or a block, for example. In certain exemplary embodiments, functional tasks can be opening a door, driving a nail, turning a screw, catching a firefly, catching a fish, feeding a dragon, hitting a ball, or knocking over a block, for example.

In various embodiments, the different atomic shapes and cross-sections of the control device facilitate interoperability with a valence device that acts as a receiving fixture having one or more planar surfaces formed with one or more openings to receive the atoms from the control device. This arrangement further facilitates different grasp and operation modalities and can facilitate interaction with the external computing device and/or display device.

BRIEF DESCRIPTION OF THE DRAWINGS

FIG. 1 shows a perspective view of a control device in accordance with embodiments of the present disclosure.

FIG. 2 shows a top view of a control device in accordance with embodiments of the present disclosure.

FIG. 3 shows a side view of a control device in accordance with embodiments of the present disclosure.

FIG. 8 shows a perspective view of a depiction of an illuminated atom of a control device according to embodiments of the present disclosure.

FIG. 9 shows a depiction of a user's hand experiencing vibrations from an atom of a control device in accordance with embodiments of the present disclosure.

FIGS. 12 through 17 illustrate various manipulations of a control device corresponding to various graphical displays in accordance with embodiments of the present disclosure.

FIG. 32 is an illustration showing the interaction of a control device with a valence corresponding to a graphical display in accordance with embodiments of the present disclosure.

DETAILED DESCRIPTION

Figure 4:
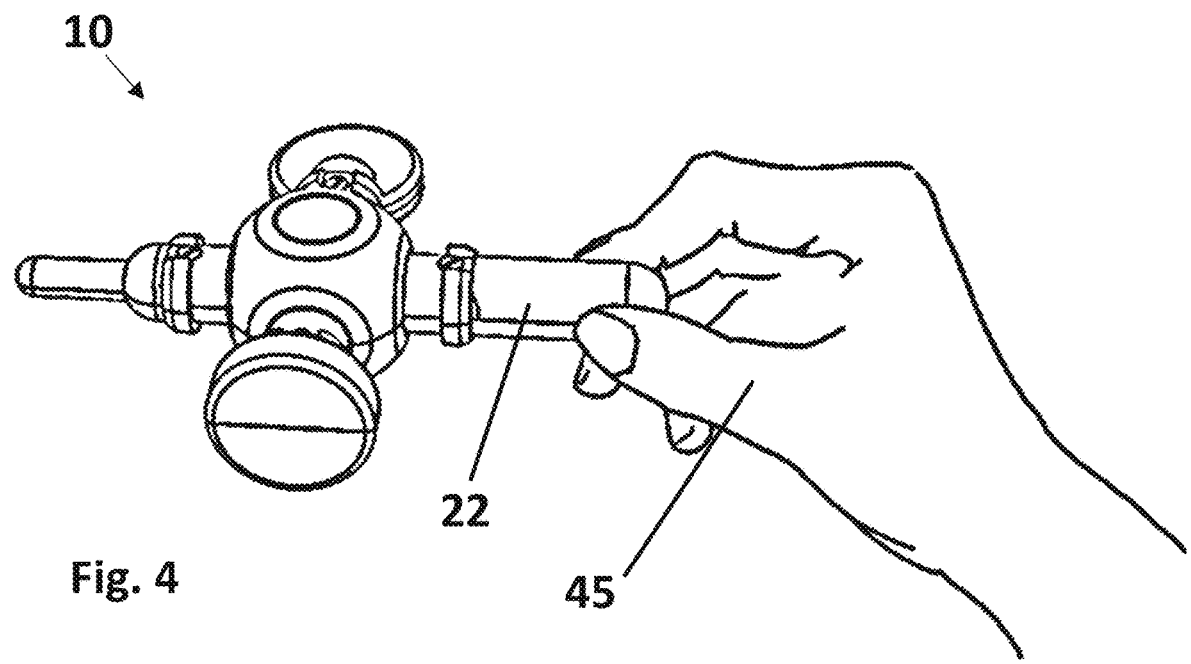
FIG. 4 shows a user's hand holding an embodiment of the present disclosure with a three-point pinch precision grasp.

The presently disclosed subject matter now will be described more fully hereinafter with reference to the accompanying drawings, in which some, but not all embodiments of the presently disclosed subject matter are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated drawings. Therefore, it is to be understood that the presently disclosed subject matter is not to be limited to the specific embodiments disclosed and that modifications and other embodiments are intended to be included within the scope of the appended claims.

Where computing elements are involved, a system and/or device may be implemented as a single computing device or system or as a collection of computing devices, systems or subsystems which are communicatively coupled, directly or indirectly, and each component or subsystem of the exemplary device and/or system can be implemented in hardware, software or a combination thereof. In various embodiments, the system and/or device each have a processor and an associated memory storing instructions that, when executed by the processor, cause the processor to perform operations as described herein. It will be appreciated that reference to "a", "an" or other indefinite article in the present disclosure encompasses one or more than one of the described element. Thus, for example, reference to a processor encompasses one or more processors, reference to a sensor encompasses one or more sensors, reference to an atom encompasses one or more atoms and so forth.

As shown in FIGS. 1 through 3, embodiments of a control device 10 are shown where the control device 10 has a central hub 12 and multiple atomic elements 14 extending outwardly from the hub 12 along one or more axes (e.g., X, Y, Z axes). It will be appreciated that axes X, Y and Z are exemplary and there are multitudes of axes that can extend from the central core of the control device 10. For example, axis Y may be co-planar with and orthogonal to axis Z and axis X may be co-planar with and orthogonal to one or both of axes Y and Z. Alternatively, different axes may extend at different angles other than ninety degrees. In various embodiments, the control device 10 is untethered and unconnected to any other object, with three degrees of rotational freedom and three degrees of translational freedom. By being untethered, the control device 10 is self-contained and not mechanically connected to any other object in a way that constrains, restricts, or impedes movement in any rotational or translational degree of freedom. If connected to another device such as by a wired connection or physical arm connection, the control device 10 would potentially become awkward to manipulate and may discourage use.

Each atomic element 14 can be formed with an axially inner segment 15 that is substantially cylindrical so as to facilitate movement within a valence as described elsewhere herein, for example. Each atomic element 14 can further be formed or provided with a specialized axially outer segment or outer end, such as a disk atom 22, a stylus atom 24, a knob atom 26, and a cylinder atom 28, for example. While the atoms 22, 24, 26 and 28 are shown as being spaced at substantially ninety degrees, with atom 22 being diametrically opposed to atom 26 and atom 24 being diametrically opposed to atom 28, it will be appreciated that the atoms may extend in a wide range of combinations to facilitate a desired therapy regimen. It will be appreciated that positioning two atoms at opposite ends of the same axis (e.g., atoms 22 and 26 on axis Y, or atoms 24 and 28 on axis Z) can facilitate certain desired movements approximating real-world scenarios. For example, providing a first atom at the opposite end of a common axis from a second atom, whereby each atom is diametrically opposed from the other and the central hub lies between the atoms, can influence a user to employ a simulated key grasp modality for turning a simulated key in a simulated door, particularly where the first atom is inserted in a valence as described elsewhere herein and wherein the second atom is provided with a shape that influences a user to employ a two-pinch or three-pinch grasp modality. It will be appreciated that embodiments of the device as disclosed herein are not limited to atoms having specific geometric shapes.

In various embodiments, the control device 10 employs an embedded microcomputer, one or more physical motion sensors (e.g., position, velocity, acceleration, rotation, rotation rate) that can be employed to track the movement of the control device, for example, one or more multi-sensory feedback elements (e.g., visual, audio, and tactile), and wireless communication capabilities. Embedded sensors within the control device 10 may include, for example, one or more triaxial accelerometers, one or more gyroscopes, a magnetic compass, and one or more color-discriminating light sensors in the hub 12. In various embodiments, a nine-axis inertial measurement unit (IMU) is provided within the control device 10, with three-axis acceleration, three-axis rotation rate, and three-axis magnetic compass (magnetometer). Further, multiple red, green, and/or blue (RGB) light-emitting diodes (LEDs) can be secured and aligned within each atom, including variable color and brightness control driver circuitry, along with an eccentric rotating mass vibrotactile motor with tactile effect driver circuitry, power/charge indicator LEDs, an on-off push button, battery monitoring and charge control circuitry and a micro-USB charge port. Capacitive sensing in each atom (e.g., 22, 24, 26, 28) may be included to enable the control device 10 and/or embodiments of the system as described herein to determine which atom is being held. Sensory feedback may be provided by a haptic vibration motor embedded in the hub 12. By installing light sources, such as independent red-green-blue (RGB) LEDs in each atomic element 14 according to certain embodiments as described herein, each atomic element 14 can independently light up a desired color with variable intensity. The atomic elements 14 can thereby serve as diffusers for integrated RGB LEDs for visual cueing and feedback. The LEDs are one form of output device in accordance with the present disclosure.

In various embodiments, the control device's electronic elements may be integrated in a single printed circuit board, with a microcontroller and Bluetooth transceiver providing wireless communications to a computing device 120 and/or display device 140. The display device 140 is one form of output device according to the present disclosure. A medical grade lithium-ion battery may be included as an external power source for the control device 10, for example. All electronics can be fully enclosed within an outer shell constructed of biocompatible ABS-M30i (ISO 10993, USP Class VI) plastic, for example. In various embodiments, the control device 10 is translucent with an outer shell enclosure formed of a two-piece clamshell construction for the hub 12, and one piece for each atomic element 14 and/or atom (e.g., 22, 24, 26, 28).

Figure 5:
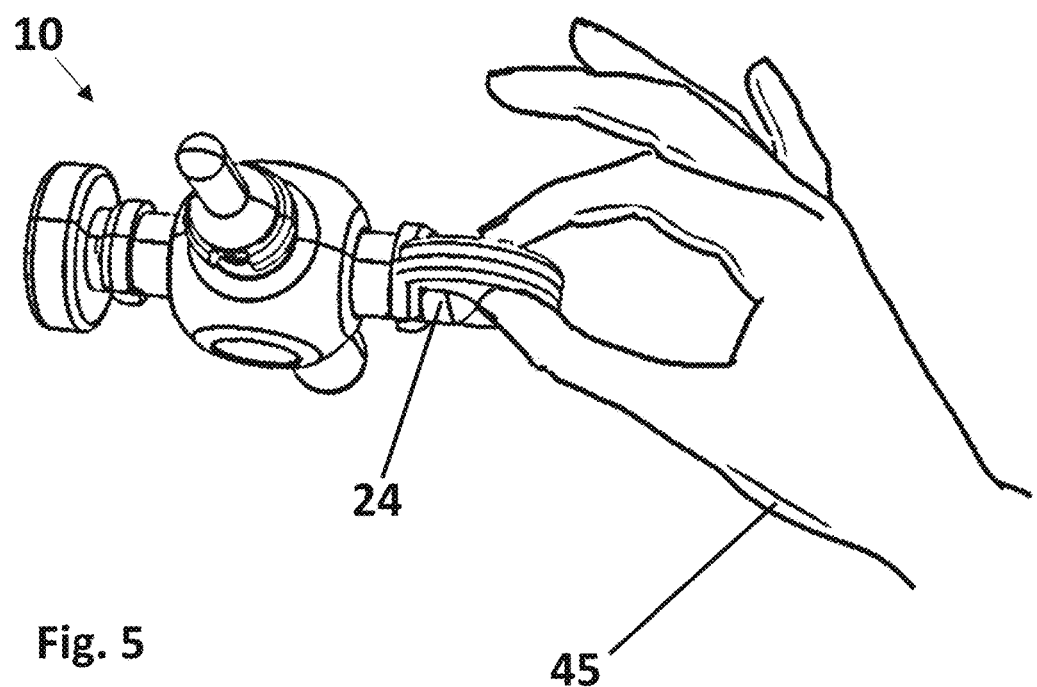
FIG. 5 shows a user's hand holding an embodiment of the present disclosure with a two-point pinch precision grasp.

As shown in FIGS. 1 through 3, the hub 12 and atomic elements 14 give the control device 10 the appearance of a molecule. FIG. 4 shows an embodiment of a control device 10 such as in FIGS. 1 through 3, wherein a user's hand 45 grips the stylus atom 24 with a three-point pinch precision grasp. FIG. 5 shows an embodiment of a control device 10 such as in FIGS. 1 through 3, wherein a user's hand 45 grips the disk atom 22 with a two-point pinch precision grasp. It will be further appreciated that, for purposes of the present disclosure, an atom is considered to be held by the human hand whether the atom is held by one or more fingers, one or more fingers together with the thumb, one or more fingers without the thumb, within the palm of the hand or other grasp modality.

Figure 6A:
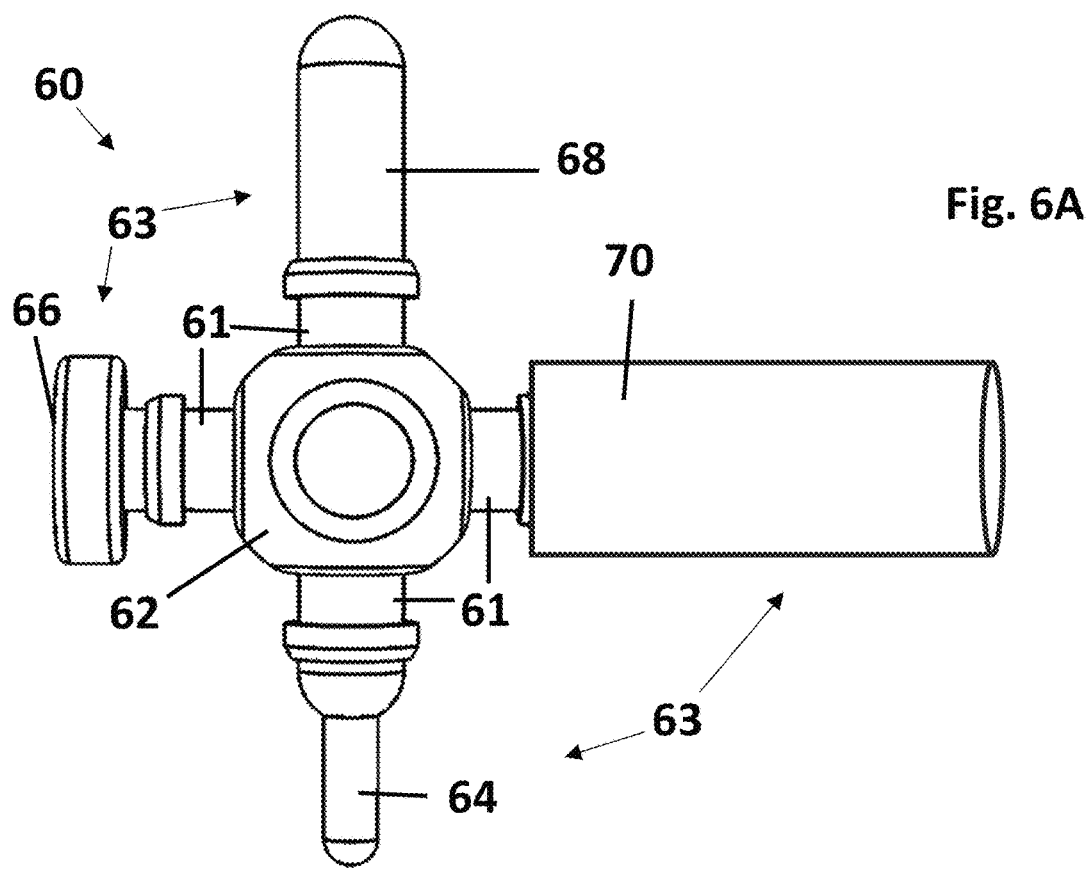
FIG. 6A shows a top view of a control device in accordance with embodiments of the present disclosure.
Figure 6B:
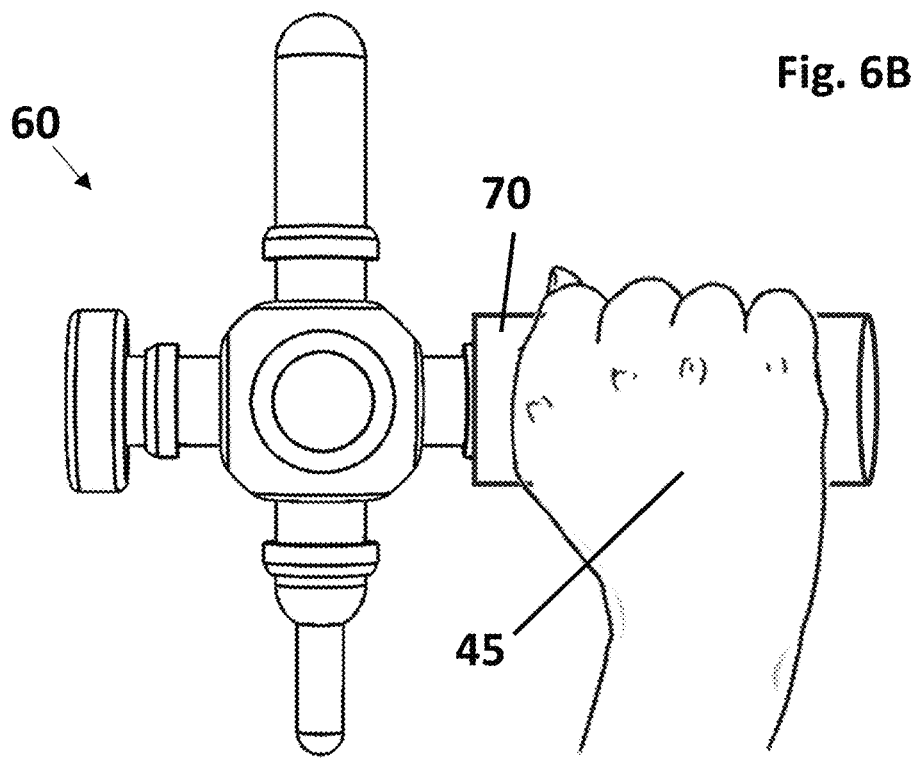
FIG. 6B shows a user's hand holding the embodiment of the control device of FIG. 6A with a cylindrical power grasp.

FIG. 6A shows an embodiment of a control device 60 similar to that in FIGS. 1 through 3, with a central hub 62 and multiple atomic elements 63 extending outwardly from the hub 62. Each atomic element 63 can include an axially inner segment 61 and an axially outer segment. The axially outer segments shown in FIG. 6A include a stylus atom 64, a knob atom 66, a cylinder atom 68, and a large cylindrical atom 70. FIG. 6B shows the control device 60 of FIG. 6a wherein a user's hand 45 grips the large cylindrical atom 70 with a cylindrical power grasp. As with the control device 10 of FIGS. 1 through 3, embodiments of the control device 60 of FIGS. 6A and 6B are untethered and unconnected to any other object, with three degrees of rotational freedom and three degrees of translation freedom.

Figure 7A:
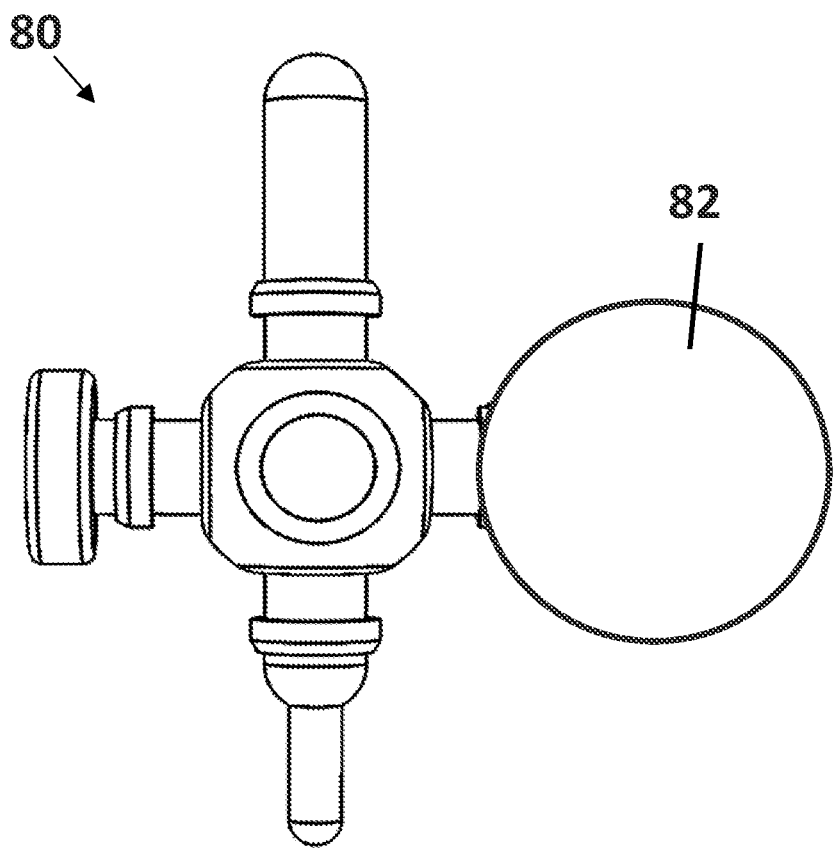
FIG. 7A shows a top view of a control device in accordance with embodiments of the present disclosure.
Figure 7B:
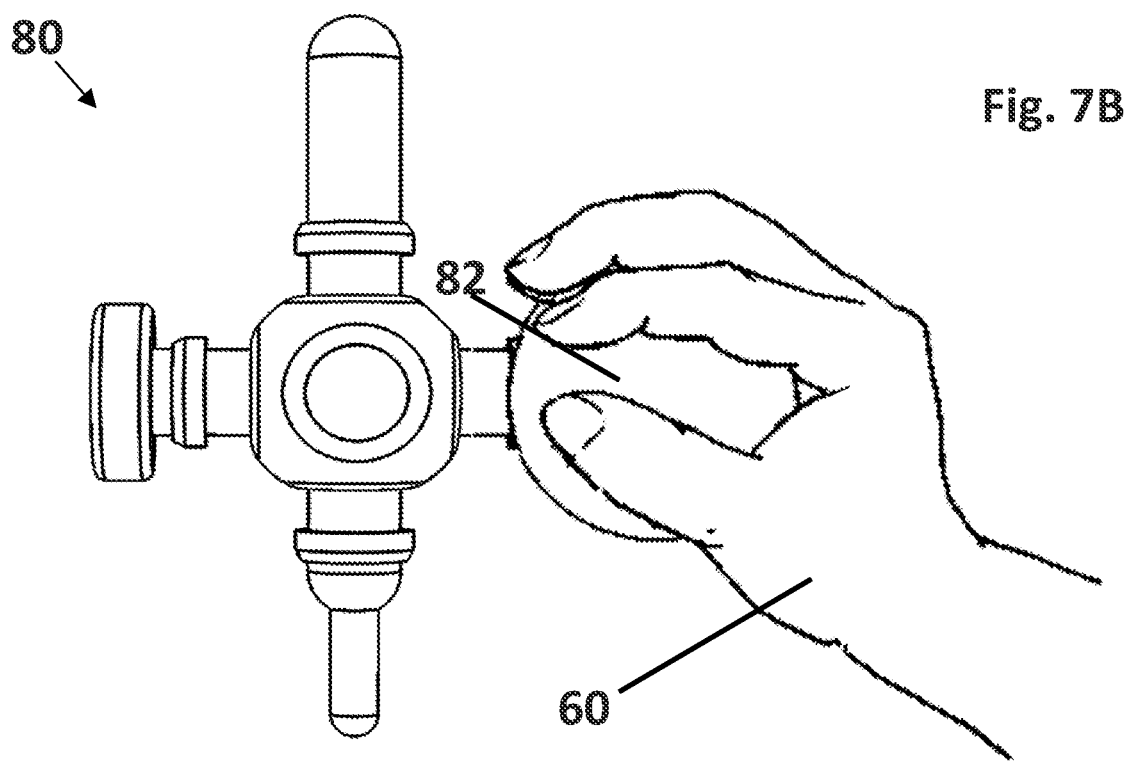
FIG. 7B shows a user's hand holding the embodiment of the control device of FIG. 7A with a spherical power grasp.

FIG. 7A shows an embodiment of a control device 80 similar to that in FIG. 6A, but wherein a large spherical atom 82 has replaced the large cylindrical atom 70 of FIG. 6A. FIG. 7B shows the control device 80 of FIG. 7A wherein a user's hand 45 grips the large spherical atom 82 with a spherical power grasp. It will be appreciated that the different atoms with different geometric shapes are adapted to be held by the human hand in different grasp modalities. It will be further appreciated that, for purposes of the present disclosure, an atom is considered to be held by the human hand whether the atom is held by one or more fingers, one or more fingers together with the thumb, one or more fingers without the thumb, within the palm of the hand or other grasp modality. As with the control device 10 of FIGS. 1 through 3, embodiments of the control device 80 of FIGS. 7A and 7B are untethered and unconnected to any other object, with three degrees of rotational freedom and three degrees of translation freedom.

FIG. 8 shows an embodiment of the control device 10 of FIGS. 1 through 3, wherein an integrated LED 90 illuminates cylinder atom 28. FIG. 9 shows an embodiment of the control device 10 of FIGS. 1 through 3, wherein an integrated tactile sensory output transducer (not shown) embedded within the control device causes vibrations (illustrated at 98) in the control device 10 that can be felt by the user's hand 45 upon grasping and/or manipulating stylus atom 22. The tactile sensory output transducer is one form of output device in accordance with the present disclosure.

Figure 10:
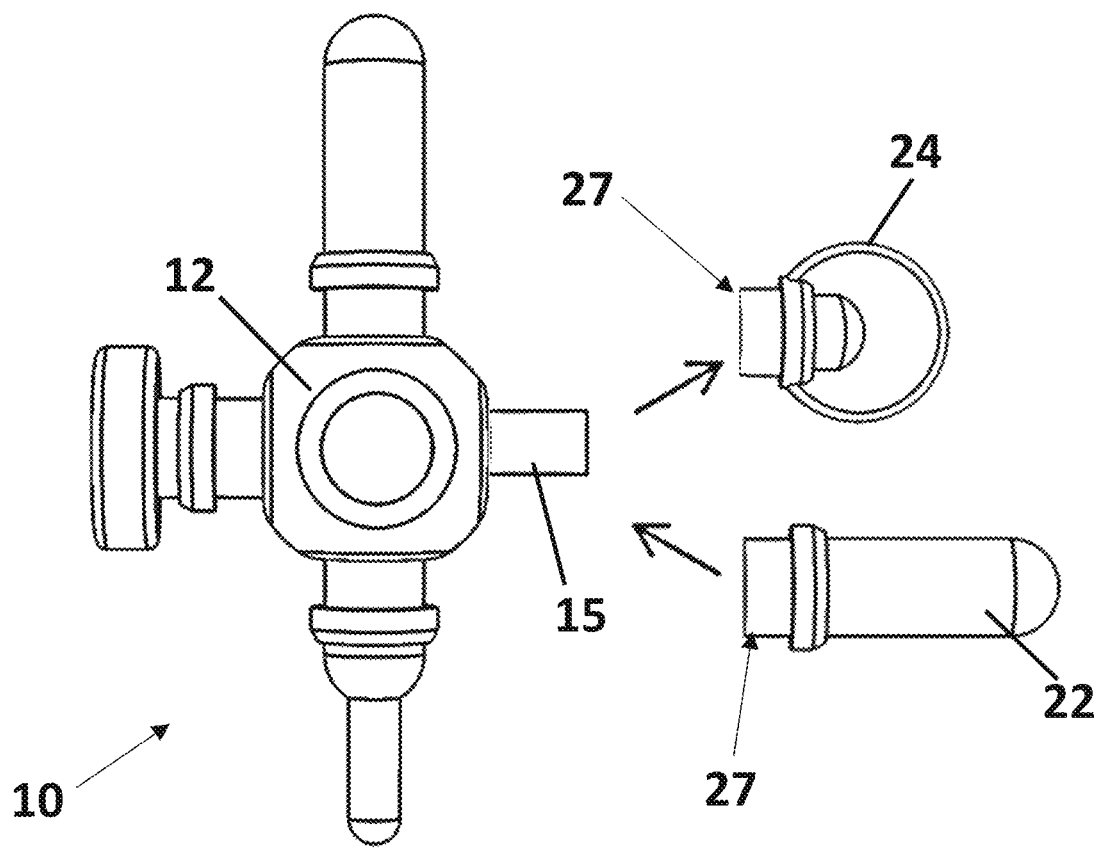
FIG. 10 shows a top view of a control device in accordance with embodiments of the present disclosure wherein multiple atoms are interchangeably connectable.

In various embodiments such as shown in FIG. 10, the atomic elements 14 can be formed with an axially inner segment 15 that is detachable from the axially outer segment, i.e., the atom. Thus, as shown in the exemplary embodiment of FIG. 10, a disk atom 24 can be removed from an axially inner segment 15 and a cylinder atom 22 installed in its place. It will be appreciated in such embodiments that the atoms 24, 22 can be formed with a cylindrical wall 27 that can be placed around inner segment 15 and slid towards central hub 12 so as to be maintained on the axially inner segment 15 in a friction fit. In alternative embodiments, the atomic elements 14 can be formed as single, integrated, monolithic elements, wherein the axially inner segments 15 can be pushed into cylindrical openings in the central hub 12.

Figure 11:
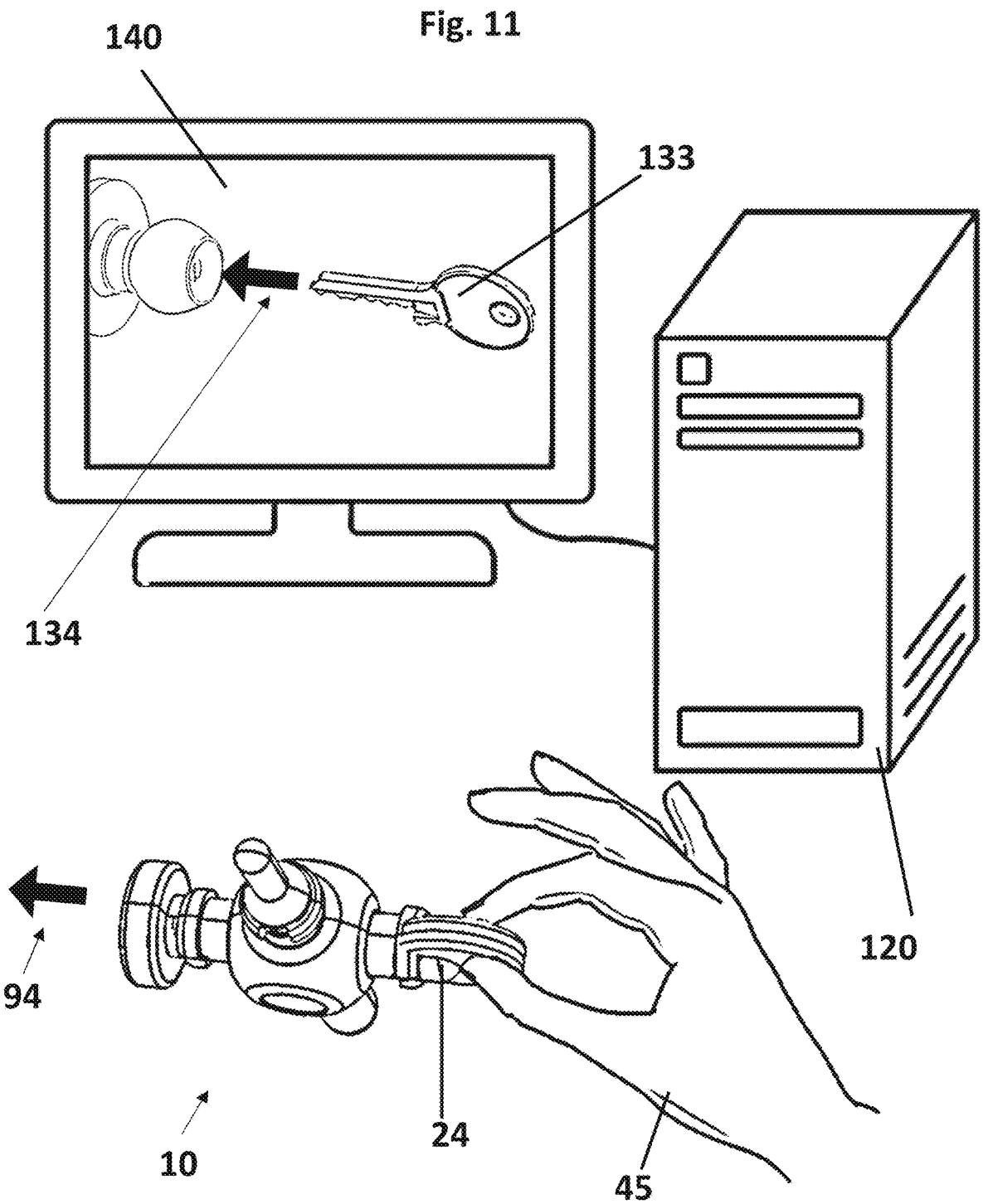
FIG. 11 is a diagram of a system according to embodiments of the present disclosure wherein an external computing device is in communication with a control device.

In the embodiment of the present disclosure shown in FIG. 11, an external computing device 120 is operatively configured to graphically present movement as at 134 of an avatoy 133 on a display 140 such as a video monitor, wherein the displayed movement corresponds to the movement 94 of the control device 110 grasped by a human hand 45 using an atom such as disk atom 24, for example.

In various embodiments such as shown in FIGS. 11 though 17, the form of the avatoy can be determined by the detection of human grasp of one or a unique combination of atoms on the control device 10. In exemplary embodiments of FIGS. 11 and 17, grasping of a disk atom 24 by a human hand 45 results in the avatoy taking on the form of a simulated key 133 in a virtual world. As noted elsewhere herein, capacitive sensing in each atom (e.g., 22, 24, 26, 28 of FIG. 1) may be included to enable the control device 10 and/or embodiments of the system as described herein to determine which atom is being held. In the embodiment of the present disclosure shown in FIG. 17, a tactile sensory output transducer (not shown) embedded within the control device 10 causes vibrations as shown at 98 in the control device 10 that are associated with an event in a virtual world, such as the collision of an avatoy such as a key 133 with a second simulated object such as a door knob 135 in the virtual world shown in display 140. The vibrations 98 in the control device 10 can be felt by the user's hand 45. In the embodiment of the present disclosure shown in FIG. 17, different vibrations 98 in the control device 10 can be associated with different virtual events. For example, if lateral movement as at 400 of the control device 10 does not result in alignment of the virtual key 133 with the virtual door knob 135, a first type of vibration may occur. Alternatively, if lateral movement as at 400 of the control device 10 does result in alignment of the virtual key 133 with the virtual door knob 135, a second type of vibration may occur. Further, upon rotation as at 401 of the disk atom 24 when the virtual key 133 is engaged with the virtual door knob 135, a third type of vibration may occur. Further, at such time, the key may be shown to rotate as at 402 in the virtual world on display 140, and the opening of a simulated door lock and/or simulated door in the virtual world may be shown on display 140.

Figure 12:
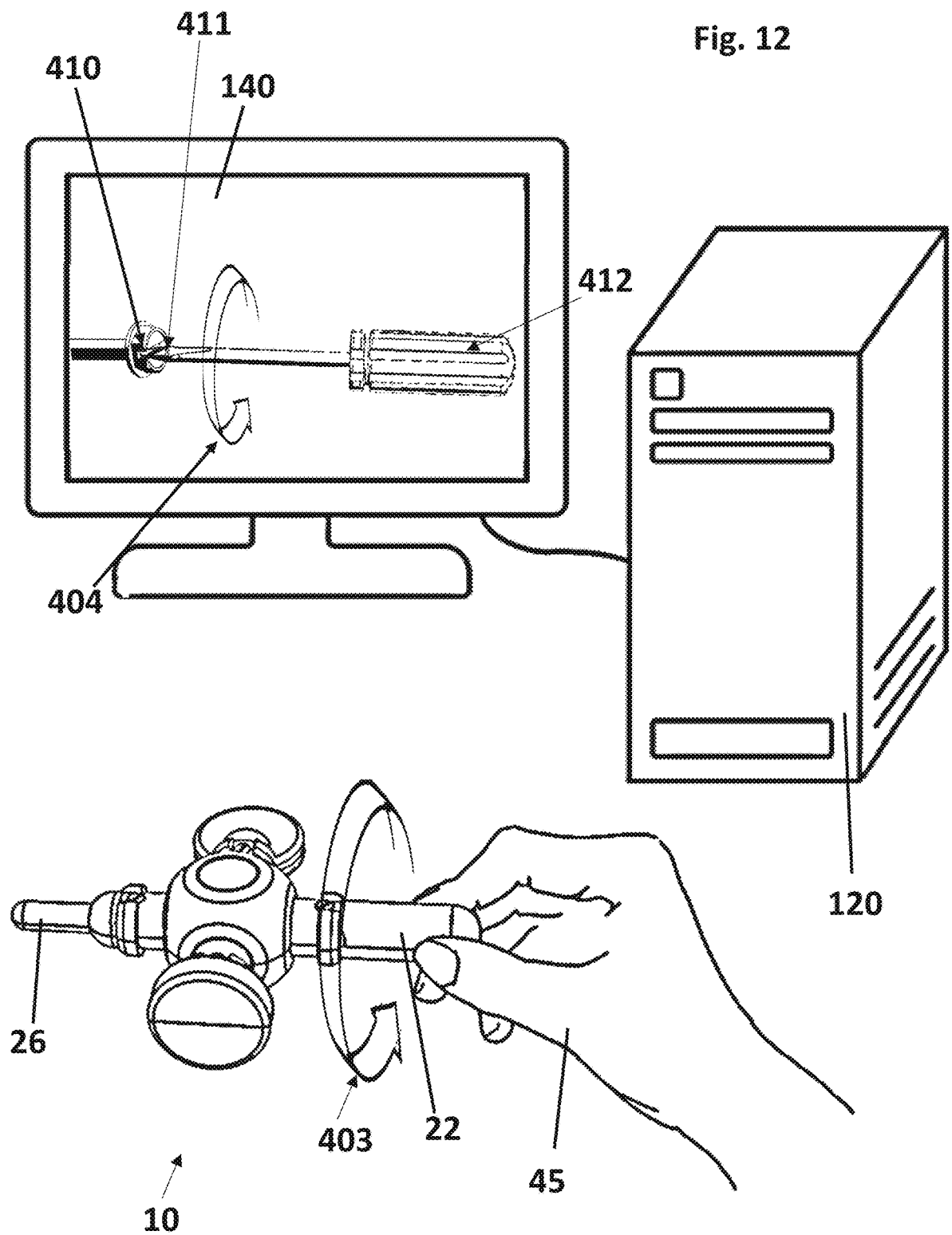
Figure 16:
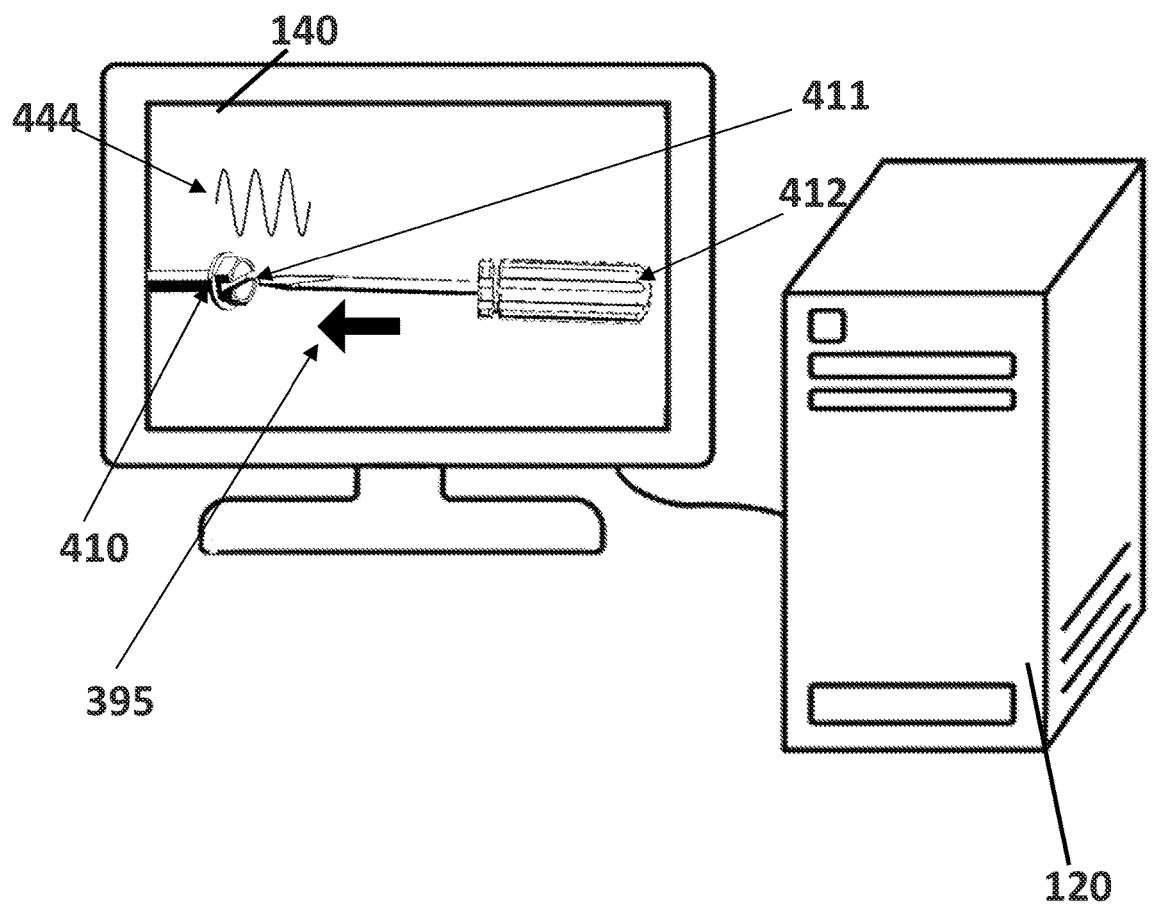
Figure 16:
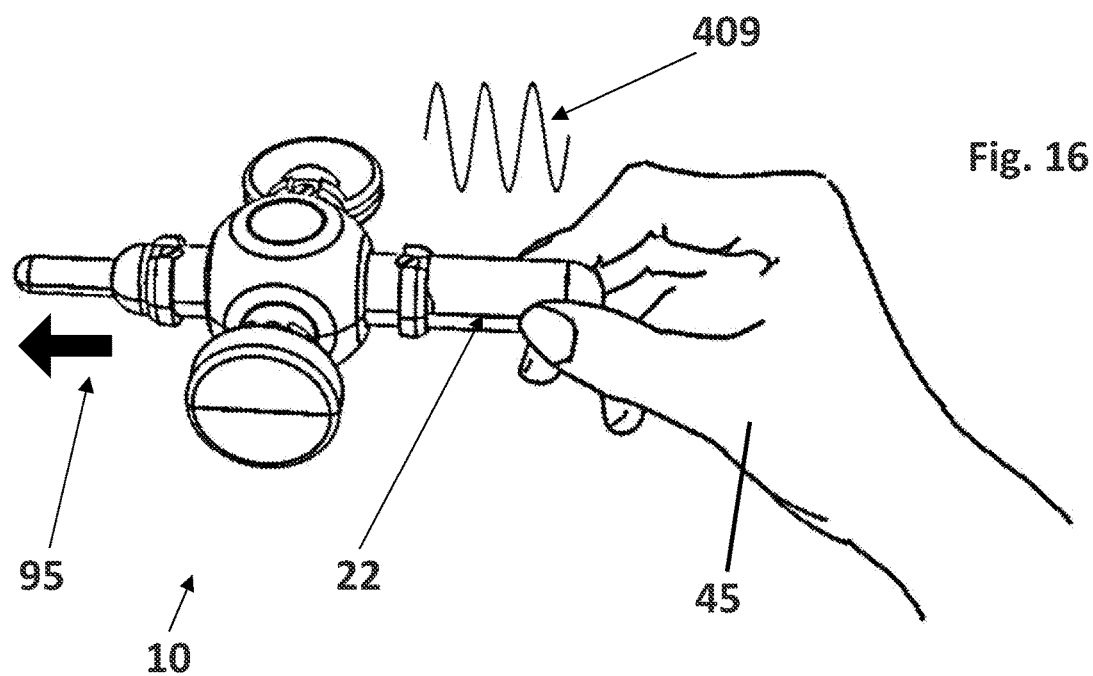

In exemplary embodiments such as shown in FIGS. 12 and 16, grasping of a cylinder atom 22 by a human hand 45 results in the avatoy taking on the form of a simulated screwdriver 412 in a virtual world. The screwdriver 412 can be provided with a simulated edge or tip 411 that can be virtually inserted into a simulated screw head 410. As the atom 22 is moved by the human hand 45 in the direction shown at 95 in FIG. 16, the screwdriver 412 is moved directionally as at 395 in FIG. 16 in the virtual world toward the head 410, where movement 395 corresponds to the movement 95. In various embodiments, if the screwdriver tip 411 does not mate properly with the virtual head 410, a first tactile response such as at 409 is produced within the control device 10, wherein the first tactile response can be moderately unpleasant or otherwise indicative of a misconnection between the screwdriver tip 411 and the head 410. If the screwdriver tip 411 does mate properly with the virtual head 410, a second tactile response, also illustrated at 409, can be produced which is more pleasant and/or indicative of a proper connection. The tactile response in the physical control device 10 can also be represented virtually as at 444 in FIG. 16, wherein the virtual representation can be a visual of a tight fit when the tip 411 mates properly with the head 410 or a visual depiction of a bouncing or deflection action on display 140. In various embodiments, a visual and a tactile response are produced. Upon the cylinder atom 22 being rotated as at 403 in FIG. 12, the virtual screwdriver 412 can be rotated as at 404 in FIG. 12, whereupon the screw or bolt head 410 can be rotated in coordination with the rotated virtual screwdriver 412. At such time, according to various embodiments, a third tactile response can be provided in the control device 10. Further, other visual signals can be provided such as the lighting of an LED in a different atom 26 from the atom 22 being grasped, and/or the movement of one or more different objects in the virtual world as shown on display 140. The different object(s) being moved can be the virtual object corresponding to the atom being grasped, such as screwdriver 412, and/or an object (such as a screw or bolt head 410, for example) being manipulated by the virtual object (e.g., screwdriver) corresponding to the object being grasped, and/or an object in the virtual world (such as a virtual toy, virtual furniture article, virtual piece of wood or other virtual object affected by the screw or bolt head 410 being turned, for example) that is affected by the manipulated virtual object. As a specific example, upon the human hand grasping the cylinder atom 22, embodiments of the present system, method and device can instruct software to display the virtual screwdriver 412 on the virtual display 140, along with a virtual screw having a head 410. Upon the human hand properly manipulating the cylinder atom 22 so as to properly mate the virtual screwdriver 412 with the virtual head 410 and further upon the human hand rotating the cylinder atom 22, embodiments of the present system, method and device can instruct software to display the screwdriver 412 turning the head 410 on the virtual display, which may in turn show the screw inserted into a virtual table or other virtual objects to secure two virtual objects together.

Figure 13:
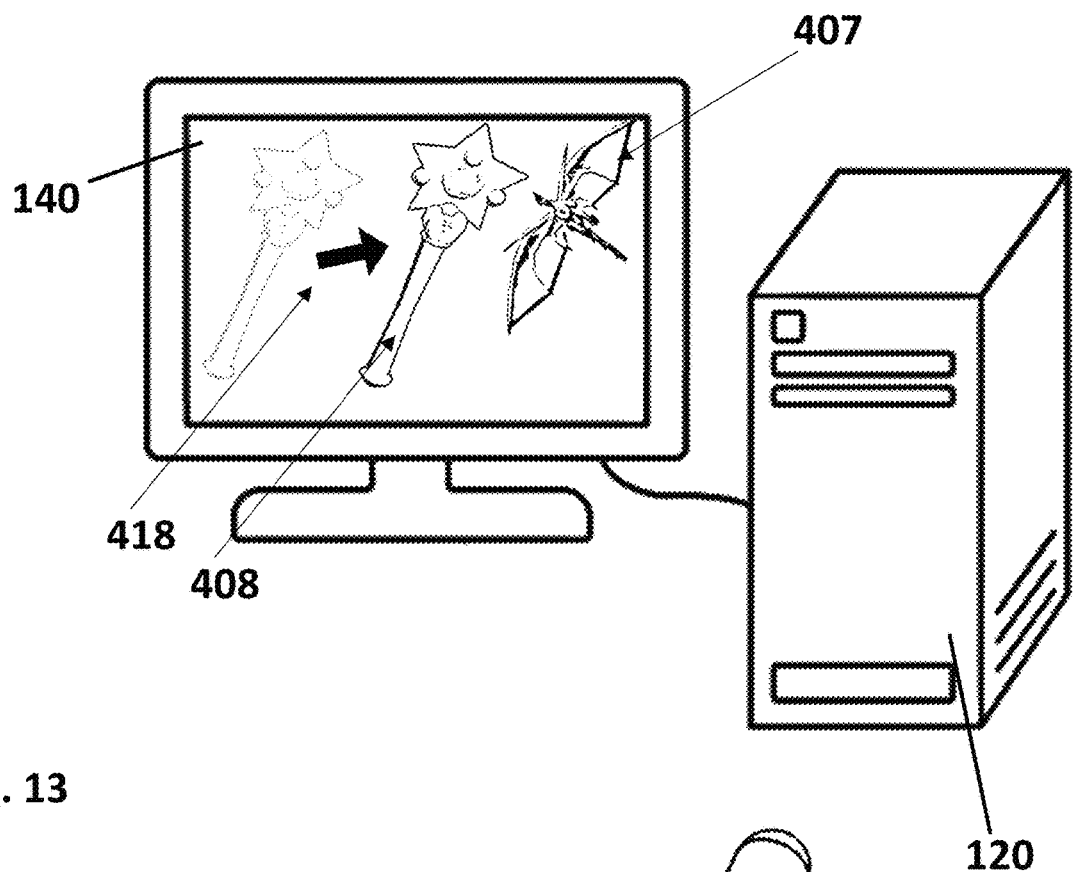
Figure 13:
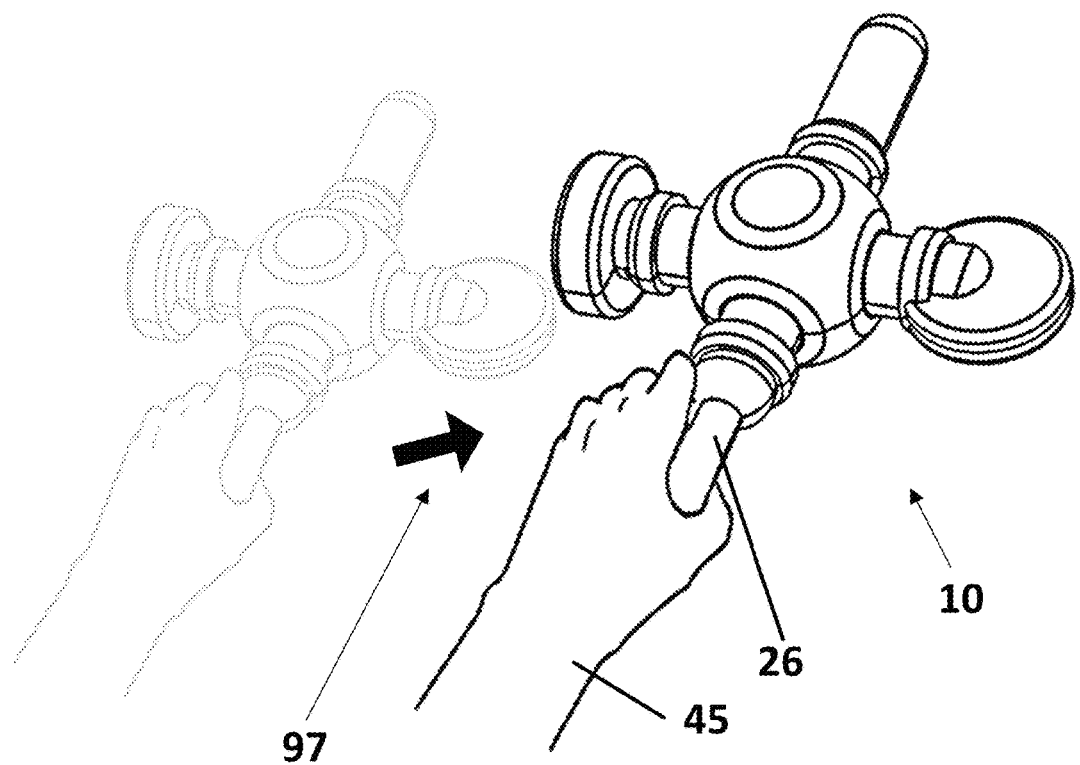
Figure 15:
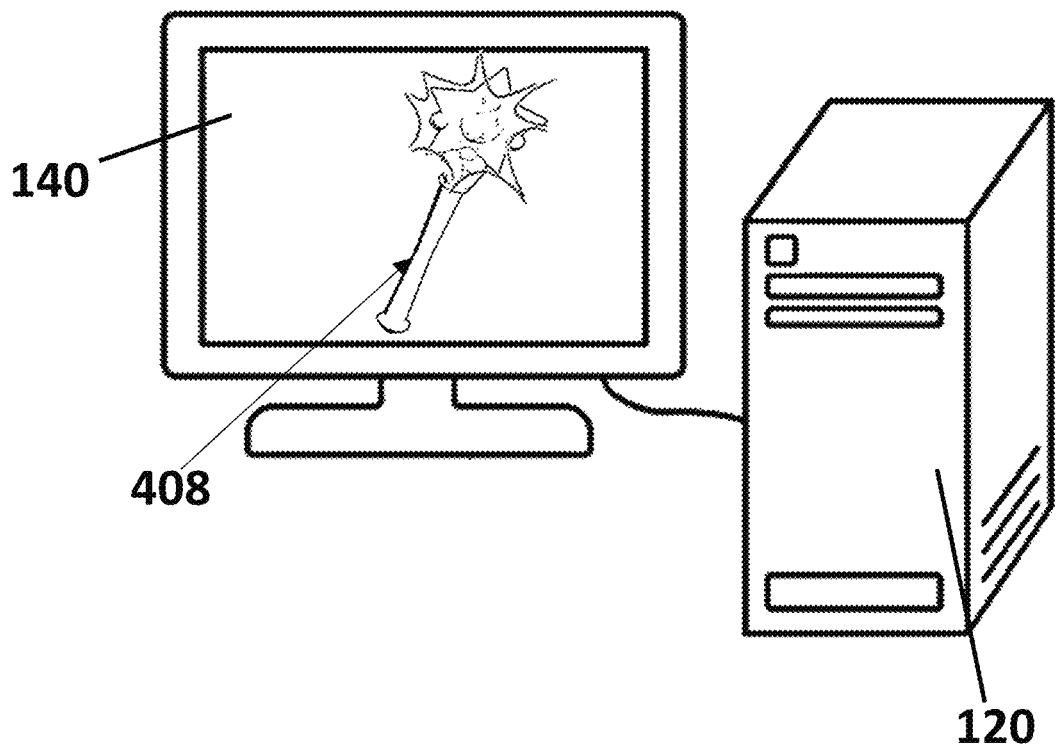
Figure 15:
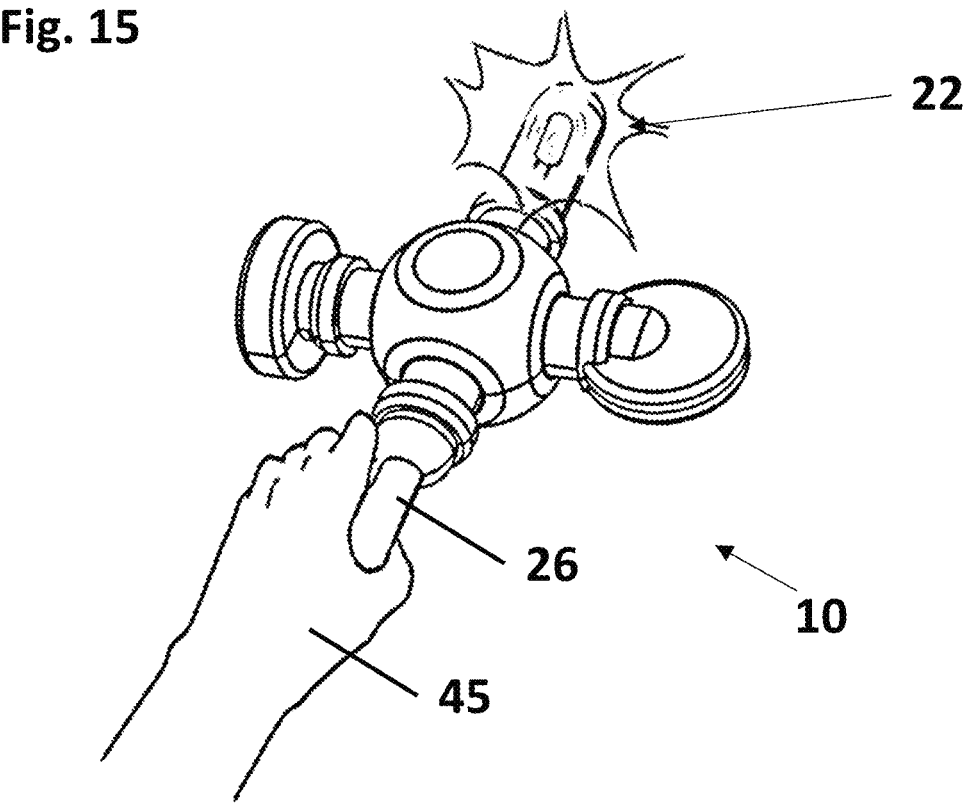

In the exemplary embodiments as shown in FIGS. 13 and 15, grasping of a stylus atom 26 by a human hand 45 results in the avatoy taking on the form of a simulated magic wand 408 in a virtual world. When the control device 10 is moved as at 97, the simulated magic wand 408 is moved as at 418 in the display 140. In the exemplary embodiment of FIG. 13, the avatoy is a simulated magic wand 408 that can be used to provide magical food to a simulated dragon 407. In various embodiments such as in FIG. 15, an LED integrated into the control device 10 is illuminated in an atom (e.g., 22) along with an object such as the magic wand 408 on the graphical display 140.

Figure 14:
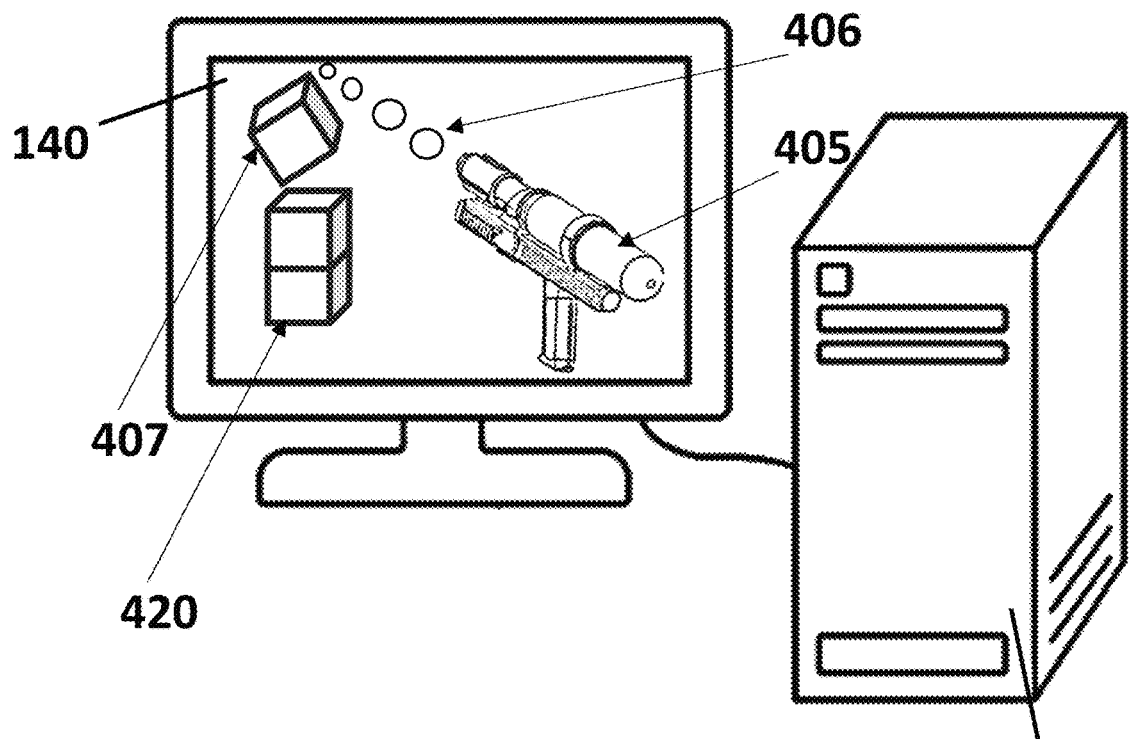
Figure 14:
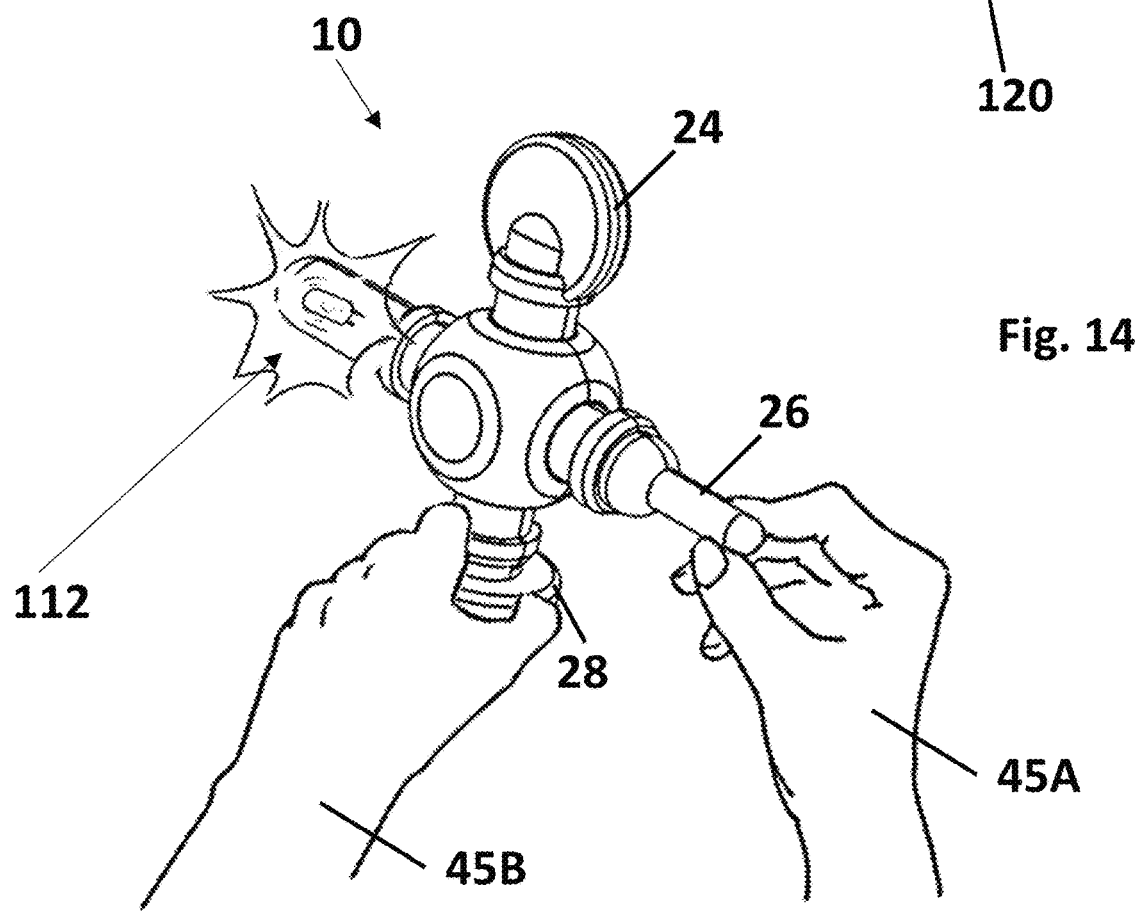

In the exemplary embodiment of FIG. 14, grasping of a knob atom 28 by a first human hand 45 results in the avatoy taking on the form of a simulated water blaster 405 in a virtual world as shown on display 140. Further, upon detection of the grasping of a second atom (e.g., stylus atom 26) after the knob atom 28 has been grasped, a simulated event in the virtual world can be determined and displayed. As shown in FIG. 14, the simulated event can be a simulated water blaster 405 firing a simulated jet of water 406 that knocks over a simulated block 407 from a stack of simulated blocks 420. In additional embodiments, upon detection of the grasping of a second atom, a different avatoy can be determined and rendered in the virtual world.

Thus, in certain exemplary embodiments, the form of the avatoy can be determined by the detection of human grasp of one (or more) of the atoms on the control device and a simulated event in the virtual world can be determined by detection of human grasp of a second atom on the control device. In an exemplary embodiment as shown in FIG. 14, an LED 112 integrated into the control device 10 is illuminated along when the desired simulated event is achieved, such as knocking over a simulated block 407 as described above. In various embodiments, the LED 112 can be illuminated synchronously with the detection of human grasp of the second atom (e.g., 26 in FIG. 14) on the control device.

Figure 18:
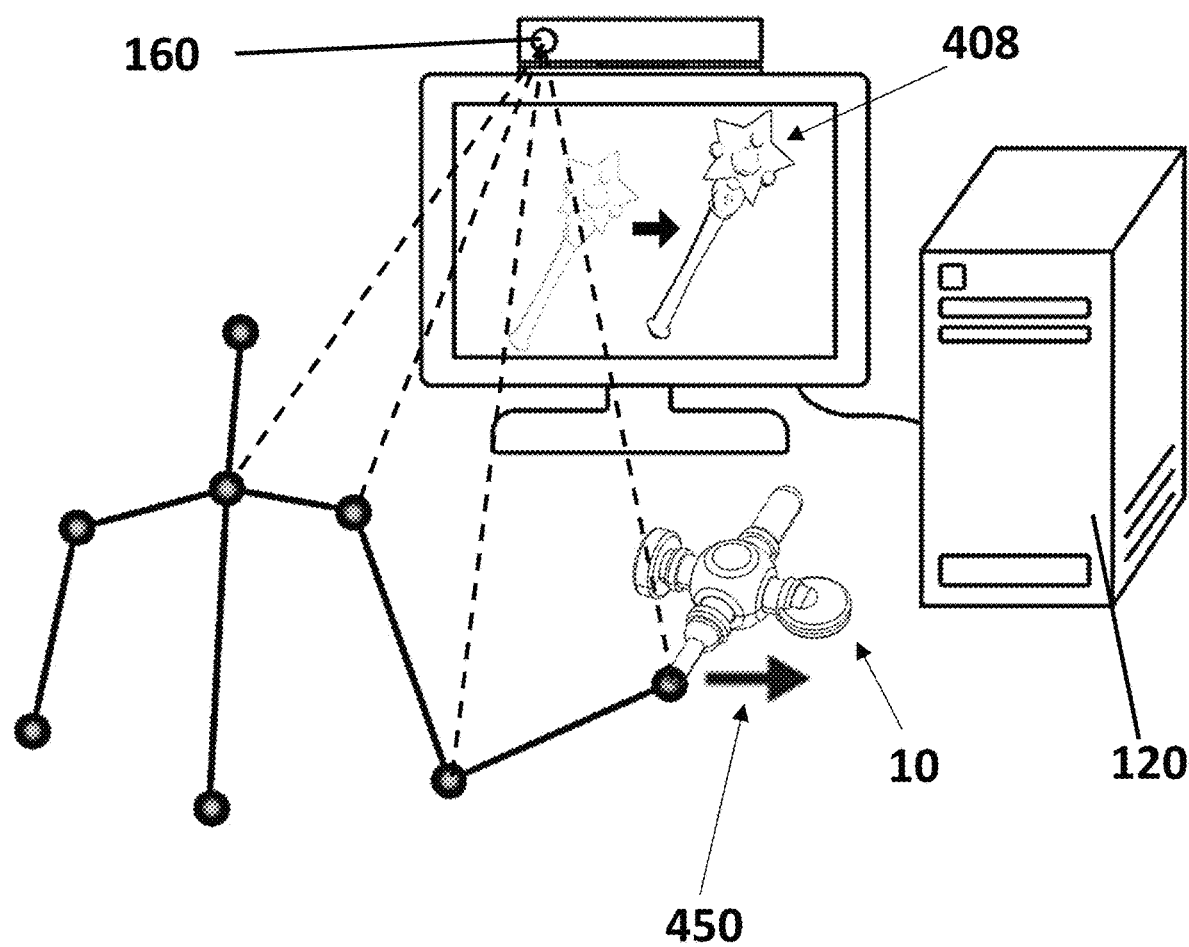
FIG. 18 is an illustration of a system according to embodiments of the present disclosure where a depth sensor camera is employed.

In the embodiment of the present disclosure shown in FIG. 18, a depth sensor camera 160 is employed to transmit information of the movement as illustrated at 450 of a person's UE (e.g., arm and hand) to an external computer 120 for display on graphical display 140, such as displaying the movement of wand 408, for example. The depth sensor camera 160 can be considered a human motion capture device in accordance with the present disclosure. An optical camera and a body-worn inertial sensor are other elements that can be employed similar to the depth sensor camera 160, and act as alternative embodiments of a human movement capture device in accordance with the present disclosure. In various embodiments, fusion of the control device's IMU data with kinematic tracking information from the depth camera 160 can be accomplished by a nonlinear human body kinematics tracking filter. The motion capture solution can integrate both real-time sensor data from the depth camera 160 with the accelerometer, rate gyroscope, and magnetic compass data streamed via Bluetooth from the control device, for example. The resulting solution enables accurate integration of real-world player movements into the games, which improves the quality of the player experience and enables the generation of UE performance metrics. The solution also enables the system to implement virtual constraints on non-affected UE involvement and/or compensatory trunk movement by selectively locking certain body positions/joint angles to require that the targeted UE be used and/or to isolate specific movements targeted by a therapy mini-game, for example.

Figure 19:
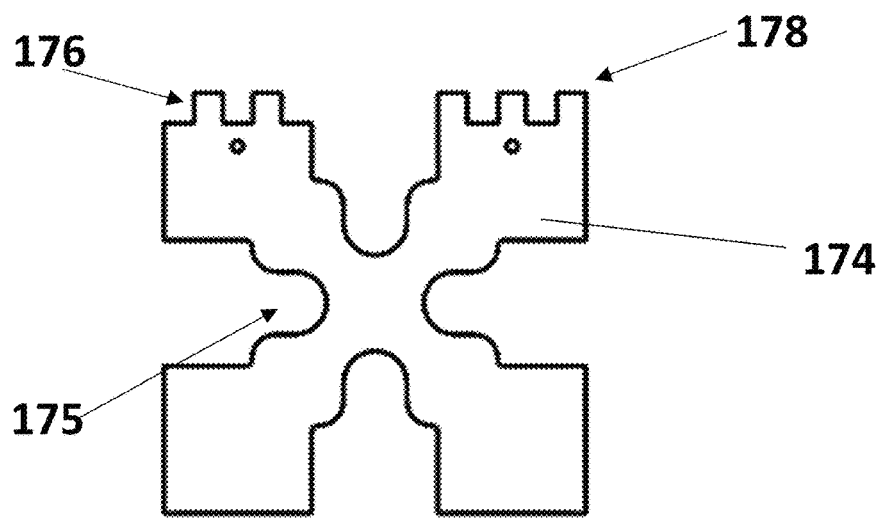
FIG. 19 is a front view of a valence component in accordance with embodiments of the present disclosure.
Figure 20:
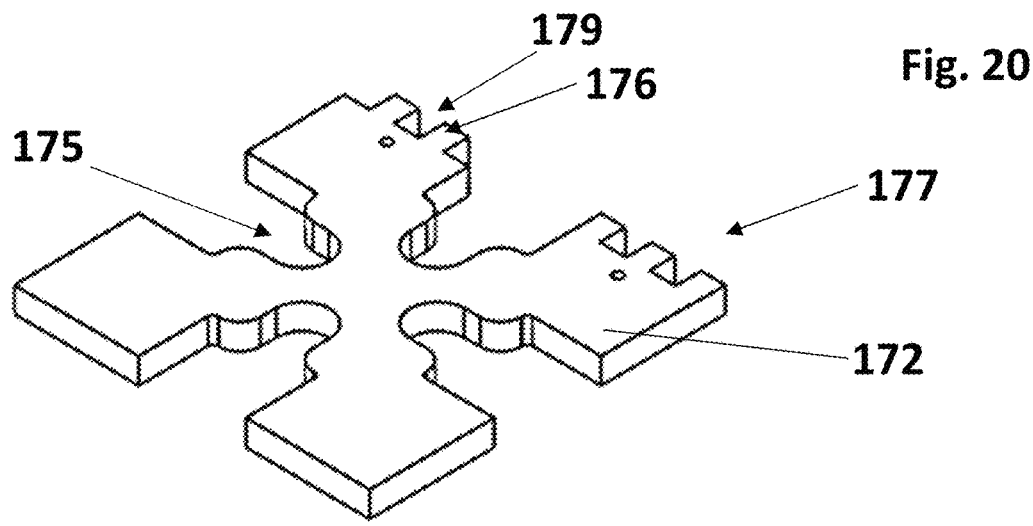
FIG. 20 is a perspective view of the valence component of FIG. 19.
Figure 21:
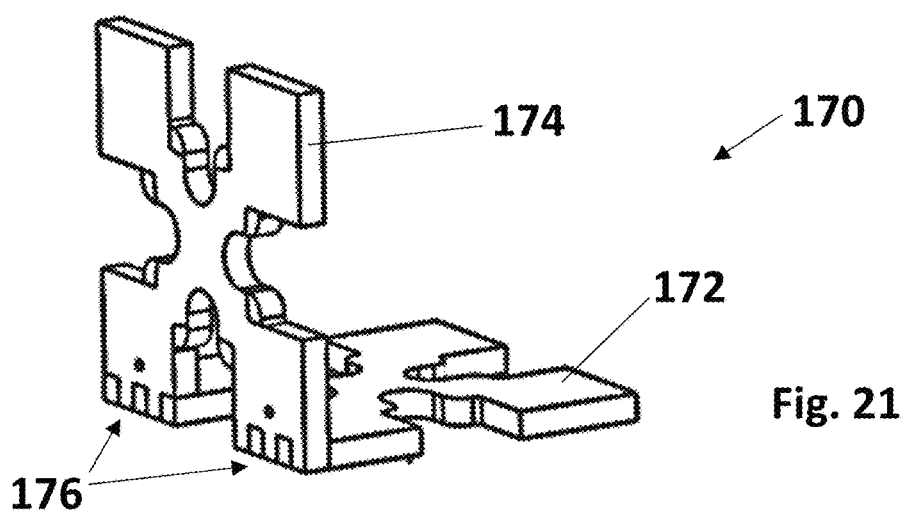
FIG. 21 is a perspective view of connected valence components in accordance with embodiments of the present disclosure.
Figure 22:
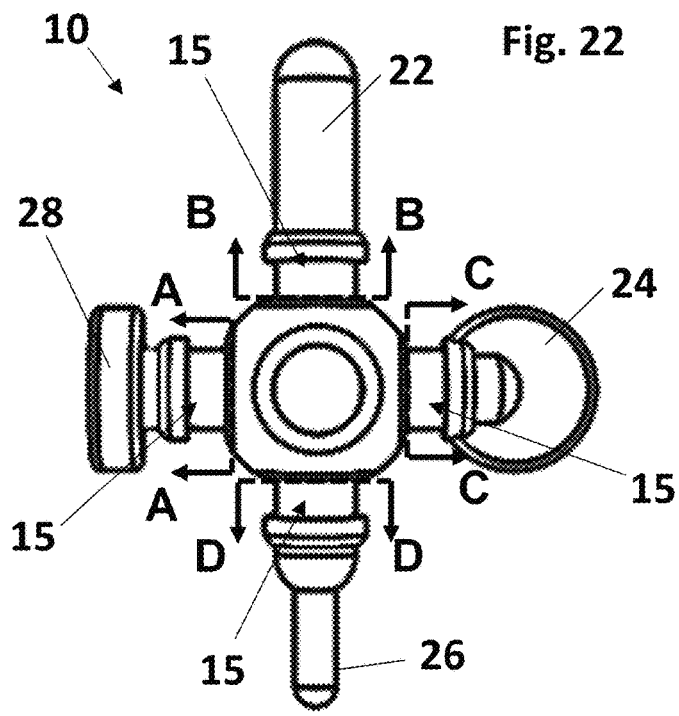
FIG. 22 shows an embodiment of a control device according to the present disclosure with different atom types.
Figure 23:
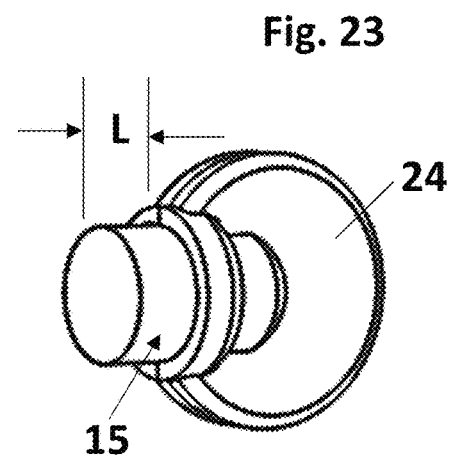
FIG. 23 shows an embodiment of a disk atom according to embodiments of the present disclosure.
Figure 24A:
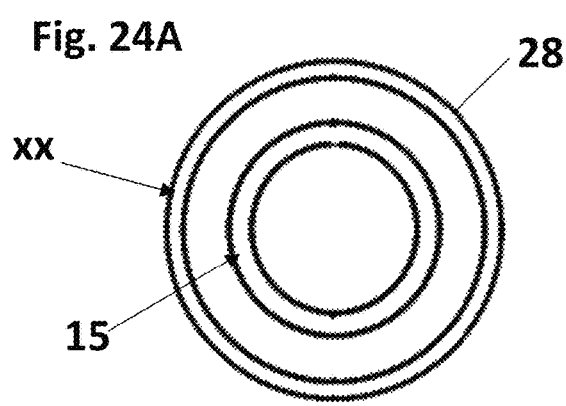
FIG. 24A is a cross-sectional view taken along the line A-A of FIG. 22.
Figure 24C:
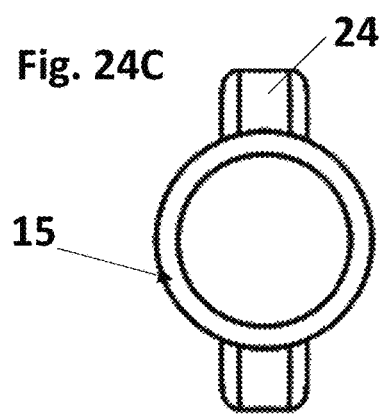
FIG. 24C is a cross-sectional view taken along the line C-C of FIG. 22.
Figure 24B:
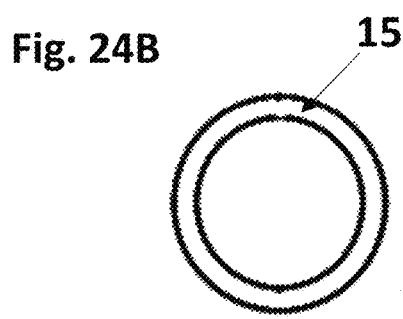
FIG. 24B is a cross-sectional view taken along the line B-B of FIG. 22.
Figure 24D:
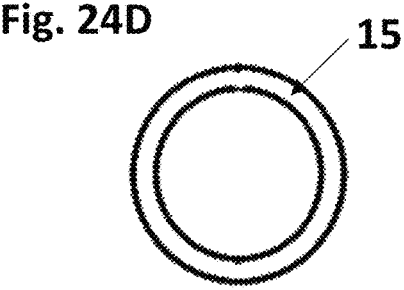
FIG. 24D is a cross-sectional view taken along the line D-D of FIG. 22.
Figure 25:
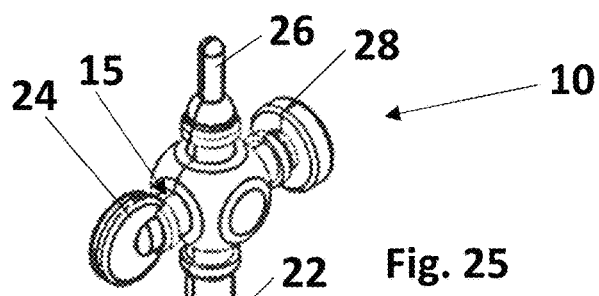
FIGS. 25 through 31 show the interaction of a control device with a valence in accordance with embodiments of the present disclosure.
Figure 26:
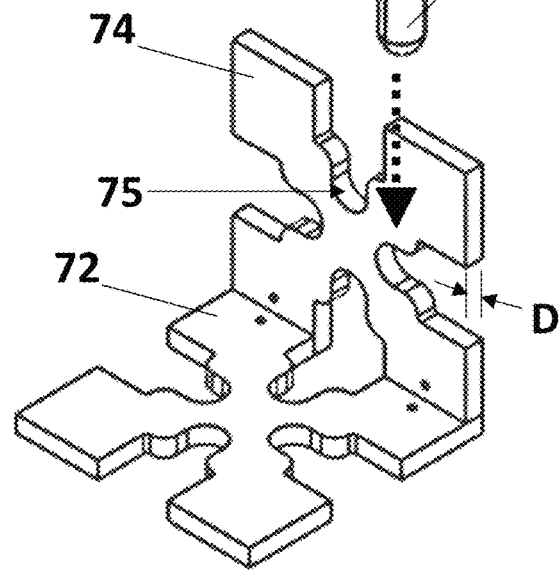
Figure 26:
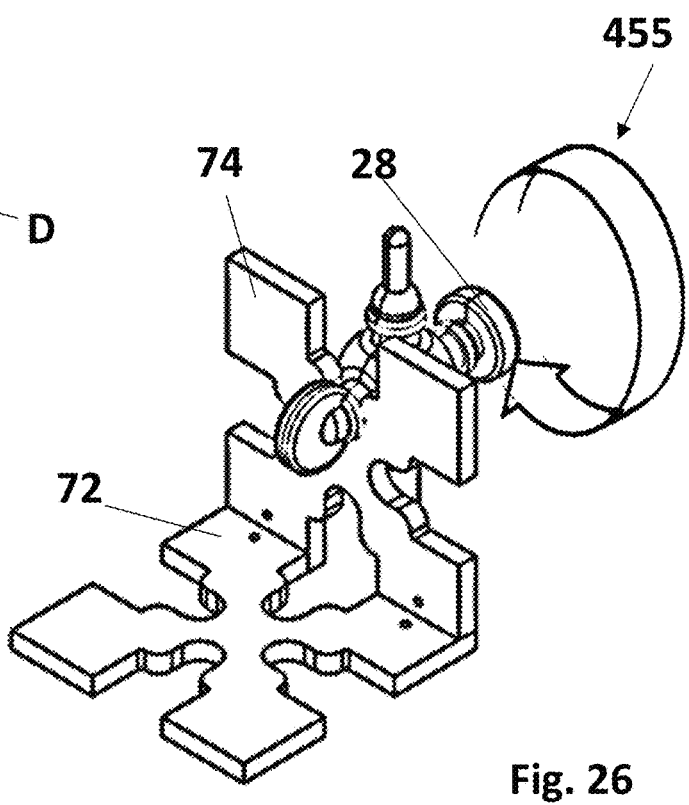
Figure 27:
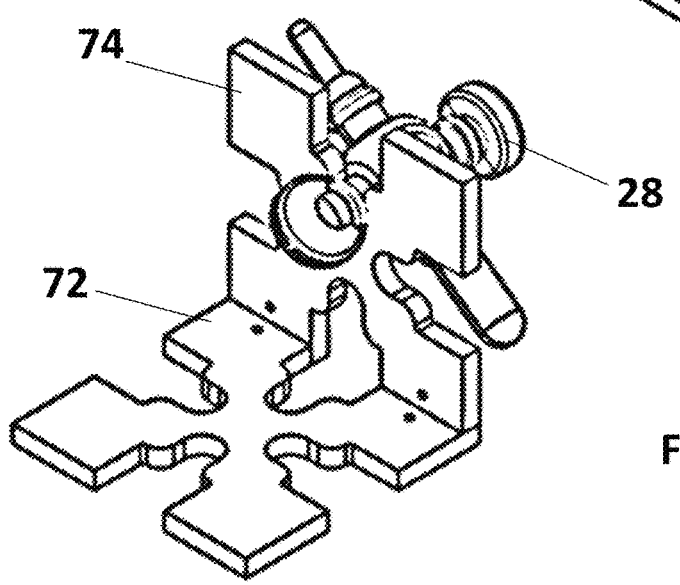

In various embodiments such as shown in FIGS. 19 through 29, a control device 10 according to the present disclosure can be employed with a valence device 170 that acts as a receiving fixture having a generally planar floor 172 and wall 174, each of which can be formed with one or more openings such as at 175 to receive the atoms from the control device. In various embodiments, the valence 170 can be a solid object made of wood, plastic, metal or other material provided with one or more solid planar surfaces formed with openings or holes of different geometric shapes or combinations of geometric shapes. As shown in FIGS. 19 through 21, the valence floor 172 can be connected to the valence wall 174 via interlocking projections 176 on edges 177, 178 thereof, wherein openings 179 are formed between the projections 176 to facilitate connection.

In certain exemplary embodiments, the openings or holes 175 in the valence 170 allow the control device's atoms and/or a subset of the control device's atoms to mate with the valence 170 such that the control device 10 can freely rotate around a single axis once an atom of the control device 10 is received into the valence 170. In certain exemplary embodiments, the cross-section of the axially inner segment 15 of each atomic element (e.g., 14 in FIG. 1) can be a circle with the same or slightly smaller diameter as a circular or appropriately shaped hole in the valence 170. The axially inner segment 15 acts as a cylindrical neck that lies between the atom (e.g., 22, 24, 26 and 28) and the central hub 12. In various embodiments, the length L (FIG. 23) of the axially inner segment 15 can be equal to or greater than the depth D (FIG. 25) of the valence 170 such that when an atom is fully inserted, the control device 10 becomes free to rotate as at 455. The free rotation is facilitated by the cylindrical axially inner segment 15 encountering no resistance within the edges of the valence 170 that form the openings (e.g., 175) therein.

Figure 28:
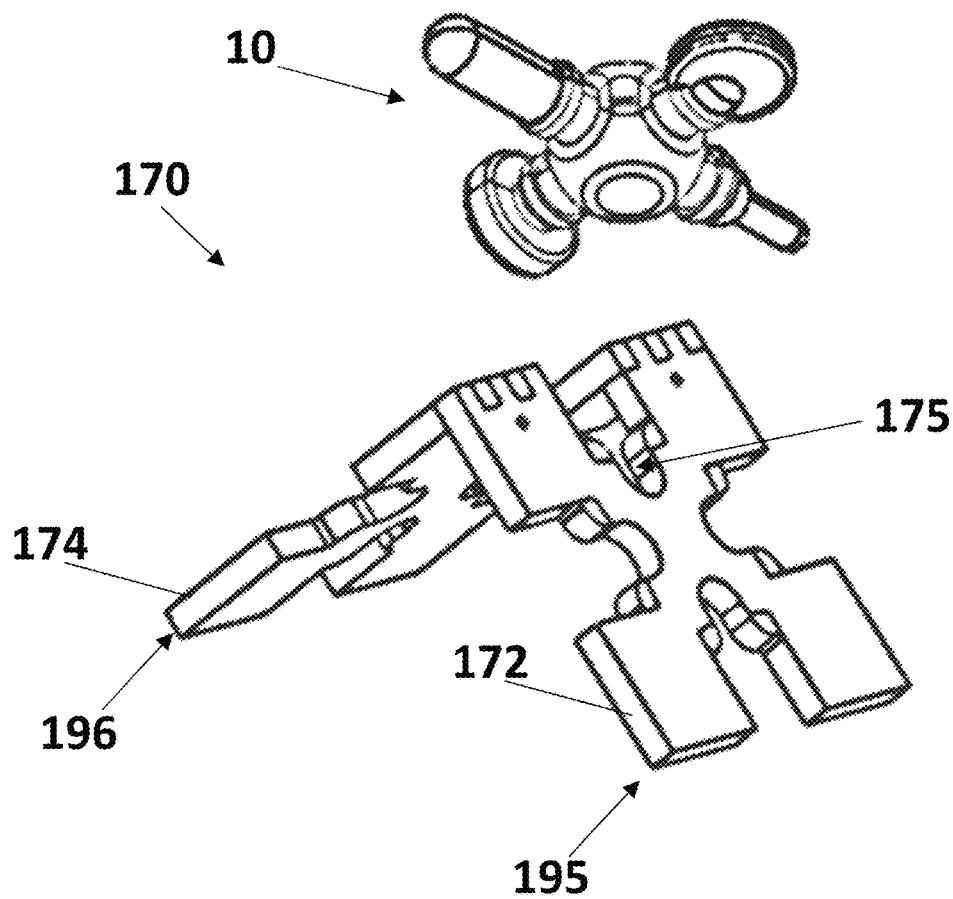
Figure 29:
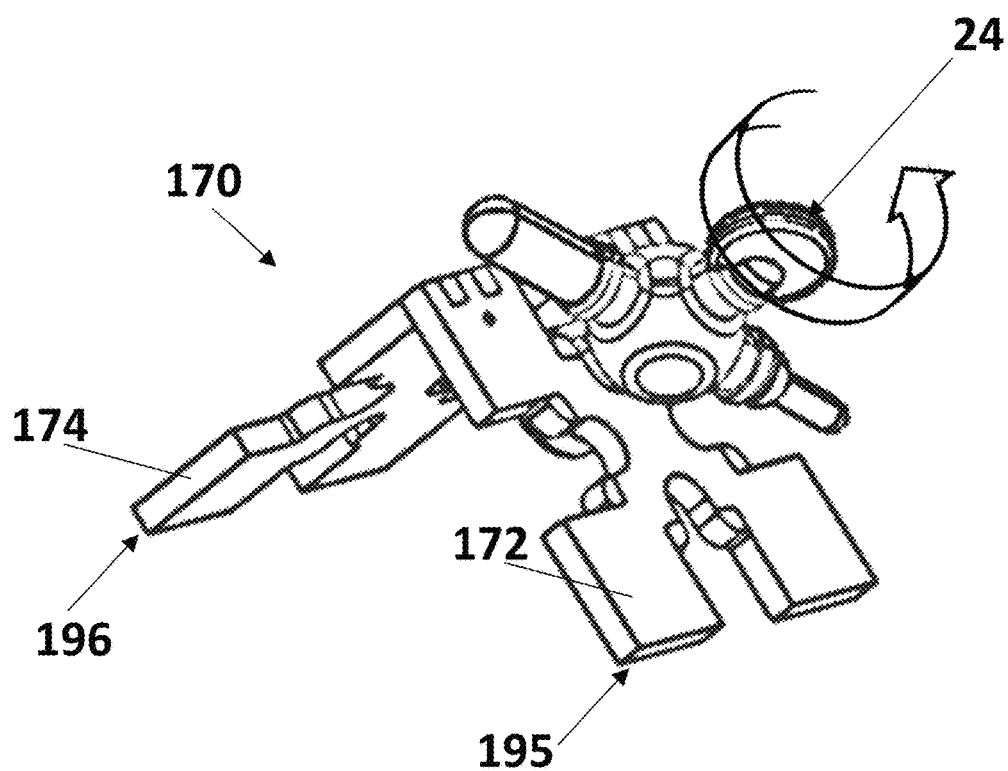
Figure 30:
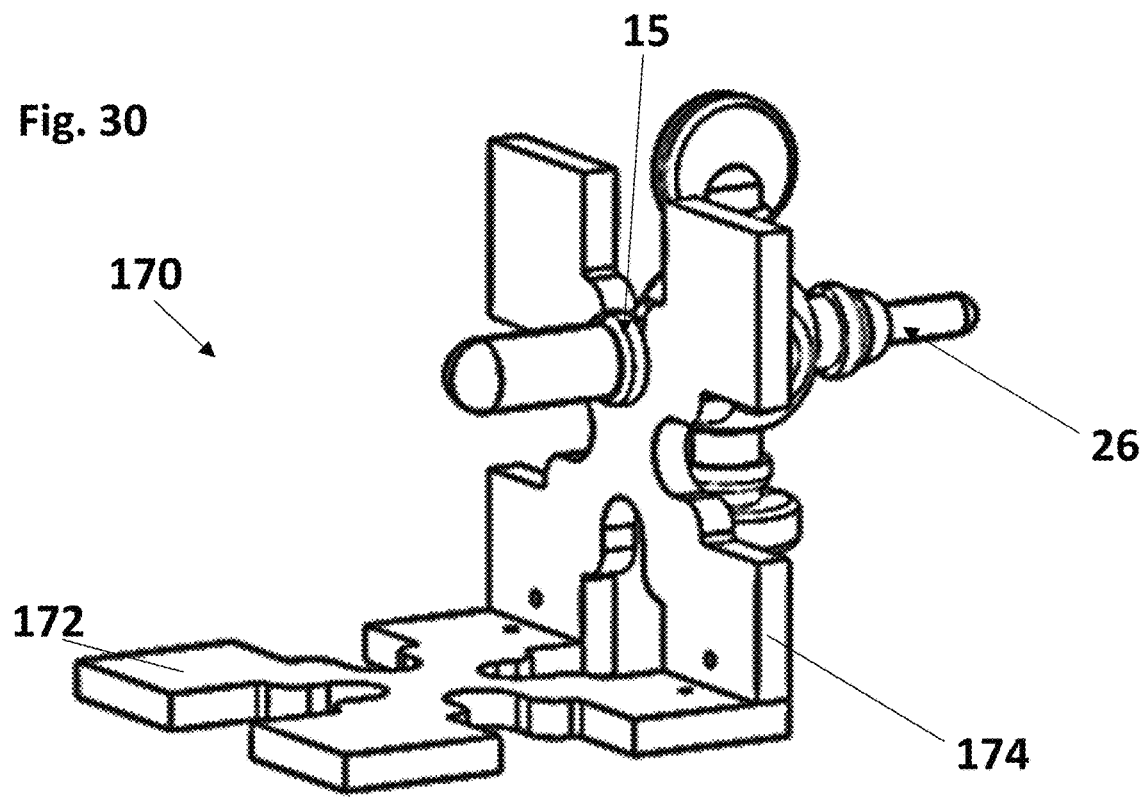
Figure 31:
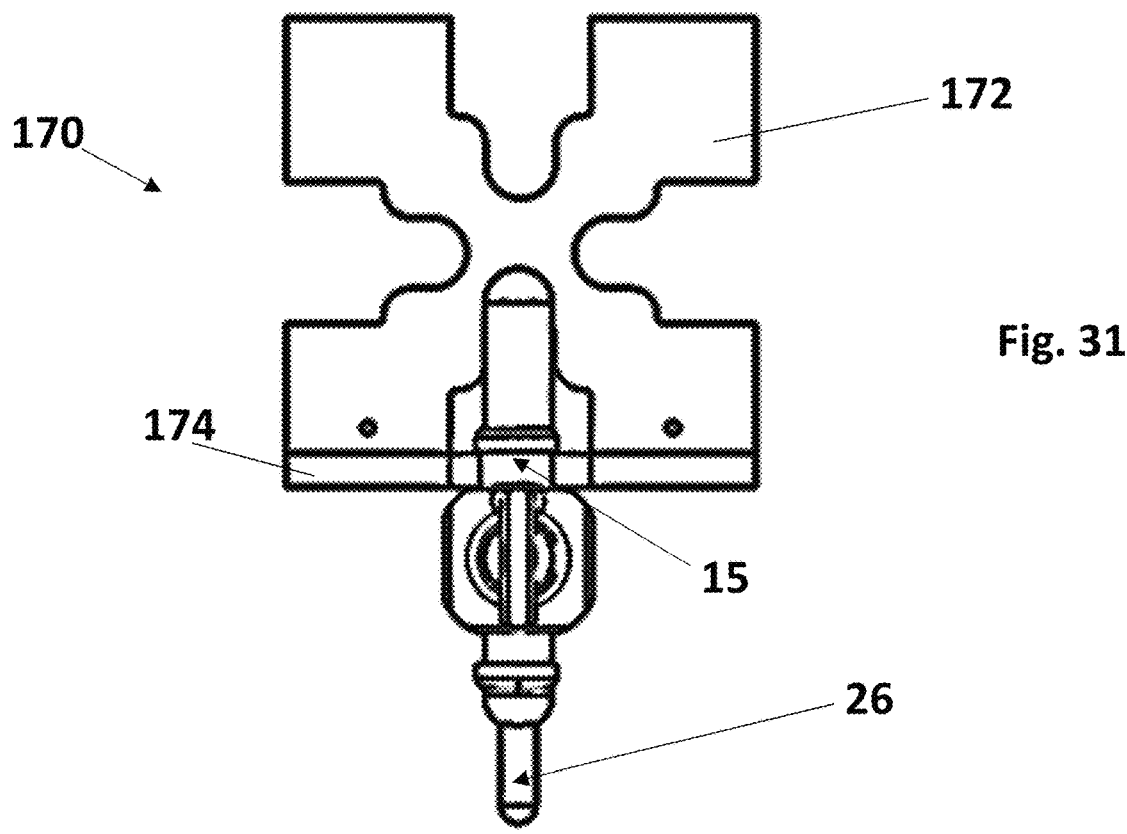

FIGS. 28 and 29 illustrate embodiments where the valence 170 is positioned such that edges 195, 196 opposite the connected edges of floor 172 and wall 174, respectively, can contact a floor, table or other support surface. In this way, the valence 170 provides a different angle at which the control device 10 can be inserted, rather than the vertical approach shown in FIGS. 25 through 27 and in FIGS. 30 and 31, for example.

In various embodiments such as illustrated in FIG. 32, for example, the control device 10 can be manipulated while in communication with a computing device 120 that processes instructions to cause a display device 140 to present a visual display corresponding to, based on, or to influence actions of, a user manipulating the control device 10. As shown in FIG. 32, for example, a user's hand 45 is manipulating the control device 10 such that the lateral pinch grasp of the disk shape atom 24 permits the user to rotate the control device 10 within the valence 170. A computing device 120 receives information, signals and/or feedback from one or more sensory elements within the control device 10 to present a graphical depiction of movement (e.g., 332) of a simulated object such as key 333 on a video monitor 140 corresponding to the movement (e.g., 330) of the control device 10. The interaction between the control device 10 and the valence 170 as shown at 338 can provide a sensation to the user of locking or unlocking a door handle, which sensation can be represented in the virtual world via door handle 335.

Figure 33:
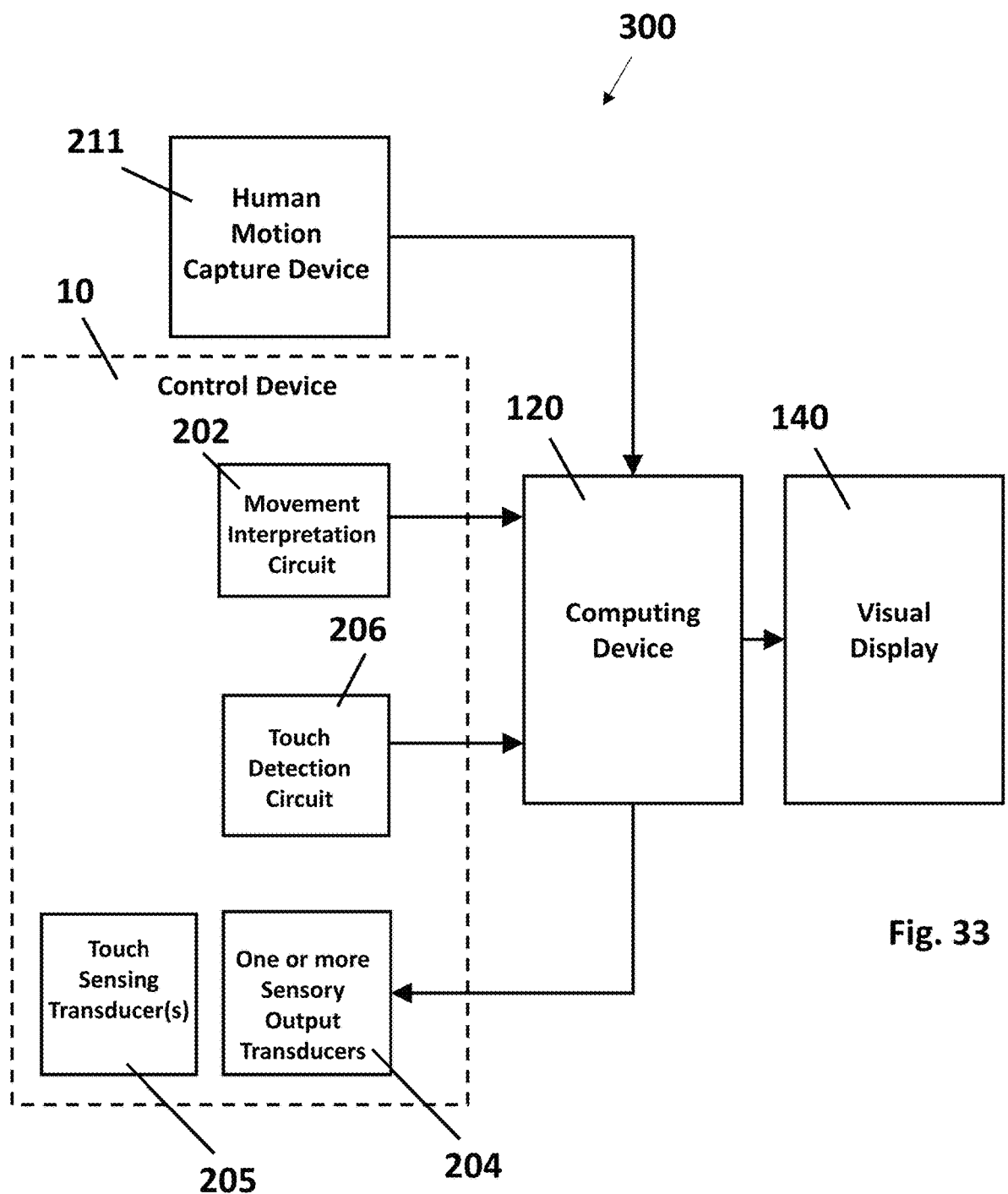
FIG. 33 is a schematic diagram of an exemplary system in accordance with the present disclosure.

FIG. 33 shows a diagram of a system 300 in accordance with embodiments of the present disclosure, wherein the system includes a control device 10, a human motion capture device 211, a computing device 120, and a visual display system or device 140. It will be appreciated that the human motion capture device 211 is not required for embodiments of the system to operate as disclosed herein. The control device 10, with a geometric form that can include a central hub and multiple atomic elements as described elsewhere herein, can include a movement interpretation circuit 202, one or more sensory output transducers 204, one or more touch sensing transducers 205 and a touch detection circuit 206. Elements 202, 204, 205 and 206 can be embedded within the control device, for example, as described in connection with FIGS. 1 through 3 herein. A sensory output transducer is one form of an output device in accordance with the present disclosure. In various embodiments, a user's UE movements can be sensed and interpreted by the human motion capture device 211 to generate kinematic tracking data that is transmitted to the computing device 120. The user can physically interact with the control device's geometric form (for example, by picking up the device), resulting in human grasp of one or more atoms sensed by the touch detection circuit 206 and control device movement that is sensed by the movement interpretation circuit 202, both transmitted to the computing device 120. The touch detection circuit can be provided with one or more touch sensing transducers 205 secured within the control device and adapted to sense human grasping of the different atoms and transmit a sensed human grasping to the computing device. For example, if the user grasps a cylindrical atom, such grasping is sensed and communicated to the computing device for rendering an avatoy or other object based on sensing the grasping of the cylindrical atom. Further, if the user grasps a knob atom, such grasping is sensed and communicated to the computing device for rendering an avatoy or other object based on sensing the grasping of the knob atom. It will be appreciated that embodiments of the present disclosure can operate such that the computing device renders not only an avatoy or other object but also a simulated event upon the unique grasping of one or more atoms of the control device 10 being sensed, as described elsewhere herein.

The transmission to the computing device 120 can be considered an input signal in accordance with the present disclosure. In various embodiments, the computing device 120 can transmit one or more output signals such as sensory cues to the device's sensory output transducers 204, which can provide sensory information to the user. The output signals and/or sensory information can be visual, auditory or tactile, for example. According to various embodiments, the computing device 120 can provide graphical data to a visual display 140 which can provide graphical information to the user. The graphical data can be another form of output signal generated in response to input received from the movement interpretation circuit 202.

Figure 34:
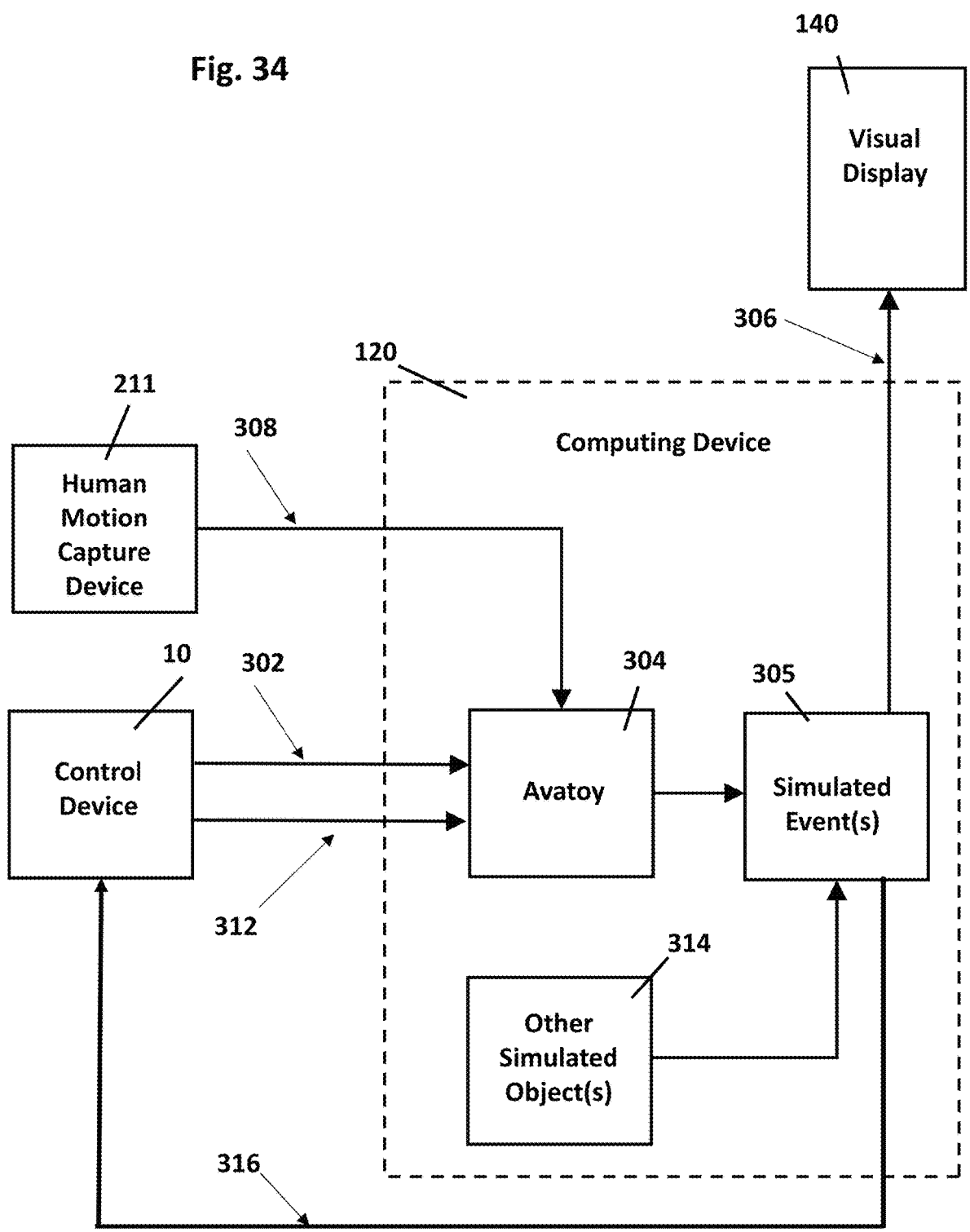
FIG. 34 shows a flow chart of an exemplary method in accordance with embodiments of the present disclosure.

FIG. 34 illustrates an exemplary method according to the present disclosure involving a control device 10, a touch sensing transducer 205 and/or human motion capture device 211, a computing device 120 and a visual display and/or visual display system 140. Data on human contact with one or more atoms on the control device sensed by a control device's touch detection circuit with touch sensing transducer 205 can be transmitted as at 312 to the computing device 120 to determine the form of the avatoy (e.g., a key or screwdriver within a virtual world), as at 304. Sensed control device movement data transmitted as at 302 and/or kinematic tracking data transmitted as at 308 by a human motion capture device 211 can be fused by the computing device 120 to determine the movement of the avatoy, as at 304. The form and movement of the avatoy can be one or more simulated events as at 305 that are graphically represented and displayed by the visual display system 140 as at 306. Interactions between the avatoy and one or more additional simulated objects 314 (e.g., a door unlocking) can be simulated events 305 that are further represented and displayed by the visual display system 140 as at 306. This action can also be translated by the computing device 120 into sensor cues that are transmitted to the control device's sensory output transducers as at 316.

It will be appreciated that each avatoy 304 can be considered a control device simulated object as each avatoy 304 is an object corresponding to the direct object being grasped when the user grasps the control device as described herein. It will further be appreciated that each additional simulated object 314 can be considered a non-control device simulated object in various embodiments of the present disclosure, wherein each additional simulated object 314 does not correspond to the direct object being grasped when the user grasps the control device but rather another object that can be rendered in the virtual world and that can optionally interact with the control device simulated object or be affected in the virtual world such as via a simulated event 305, for example. The computing device 120 can incorporate and/or be in communication with a database and/or memory storing a library of control device simulated objects such as avatoys 304, non-control device simulated objects 314 and simulated events 305.

In accordance with the embodiments described herein, upon receiving a transmission of the sensed human grasping of one of the atoms on the control device from the touch detection circuit, the computing device 120 can determine whether one of the control device simulated objects from the library and/or one of the non-control device simulated objects from the library should be rendered based on the transmission and can further render a graphical depiction of the determined control device simulated object and/or the determined non-control device simulated object in a virtual world, such as via display 140. For example, upon sensing the human grasp of the disk 24, the computing device 120 can determine that a key 133 should be rendered on the display 140. The computing device 120 can alternatively or at the same time determine that a door knob 135 should be rendered. Thus, a single grasping of the control device can result in just one element (e.g., avatoy such as key 133) being rendered or can result in multiple elements (e.g., key 133 and knob 135) being rendered in the virtual world. As described elsewhere herein, the determined elements to be rendered can include a further non-control device simulated object such as a piece of wood that can be affected in the virtual world by the control device simulated object (e.g., screwdriver 412 in FIG. 12) and/or by another non-control device simulated object (e.g., screw 410 in FIG. 12).

In various embodiments, the touch detection circuit with one or more sensing transducers is operable to sense impact of the control device 10 with the valence 170 and transmit a sensed valence impact to the computing device, and wherein the computing device is operable to, upon receiving the transmission of the sensed valence impact and based on the sensed valence impact, determine and render a graphical depiction of a non-control device simulated object from the library in the virtual world. For example, with reference to FIG. 32, upon the user grasping the disk atom 24, a key 333 can be displayed in the virtual world on display 140 and upon the user setting the control device 10 in the valence as at 338, a door handle 335 can be rendered. Further, as described elsewhere herein, a sensation to the user of locking or unlocking the door handle 335 can be transmitted as a sensory output to the control device, and this sensation can optionally be represented in the virtual world via door handle 335.

In accordance with the embodiments described herein, upon receiving a transmission of the sensed human grasping of multiple atoms on the control device from the touch detection circuit at the same time or in sequence, the computing device 120 can determine whether a simulated event 305 from the library should be rendered based on the transmission and can further render a graphical depiction of the determined simulated event in the virtual world. This is exemplified by FIG. 14, for example, where the grasping of the stylus atom 26 after or while the knob atom 28 is grasped results in the simulated event of the water jet being emitted from the blaster 405 and knocking over a block 407. The depicted or rendered event can be a depiction or movement of one or more non-control device simulated objects or can also be a depiction or movement of one or more control device simulated objects in the virtual world, for example. By way of example and without limitation, the grasping of the stylus atom 26 and/or knob atom 28 as described above can render the simulated event of the water jet, where the water jet is a non-control device simulated object. The blocks 407, 420 are also examples of non-control device simulated objects. It will be appreciated that multiple control device simulated objects can be depicted in the virtual world upon sensing of multiple atoms being grasped on the control device. For example, if a water blaster is rendered as described above, the further grasping of another atom such as the disk atom 24 may result in the rendering of a safety catch on the water blaster, where the safety catch can be manipulated on or off depending upon the grasp and movement of the disk atom 24 by the user.

In certain exemplary embodiments, the control device's movement interpretation circuit 202 can include a 32-bit Microchip™ microcontroller and a Bosch BMF055™ nine-axis motion sensor module (with triaxial 14-bit accelerometer, triaxial 16-bit gyroscope, triaxial geomagnetic sensor, for example) providing sensor measurement of control device orientation, rotational velocity, and translational acceleration. In certain exemplary embodiments, the microcontroller of the control device 10 can wirelessly transmit sensor measurements from the movement interpretation circuit 202 to a computing device (e.g., 120) using a Laird 802.15.4, Bluetooth v5.0 transceiver module. In certain exemplary embodiments, the control device 10 includes an LTC 3554 IC to provide power management and battery charge control for a medical device-compatible rechargeable 3.7V, 350 mAh Lithium Ion/Polymer battery module maintained within the control device's central hub 12.

In certain exemplary embodiments, the control device's touch detection circuit can use a Microchip™ AT42QT1050 5-channel touch sensor module. The touch sensor module can be connected to a copper wire loop that follows the contours of an atom's interior such that a human grasping of the atom increases the capacitance value measured by the sensor module, for example. The touch detection circuit can be communicatively coupled to the microcontroller, which can sample the sensed capacitance at a rate of 10 Hz.

As described and shown elsewhere herein, in certain exemplary embodiments, the control device 10 is employed with a computing device 120 that is operatively configured to translate the sensed movement of the control device 10 into the movement of a graphical representation of a control device-associated simulated object, called an avatoy, within a virtual world or computer game (e.g., 133 in FIG. 11, 412 in FIG. 16). In certain exemplary embodiments, the computing device 120 can be a Windows 10™ personal computer (PC). The computing device 120 can be operatively configured to provide graphical feedback to the user through a visual display 140 that shows the form and movement of a graphical representation of an avatoy moving in correspondence with the sensed movement of the control device 10 by a user's hand 45. The form of the avatoy can be determined by the sensed touch of one or more atoms of the control device 10 by a user's hand 45, as described elsewhere herein. In certain exemplary embodiments, the visual display 140 can be a television, a computer monitor, or a virtual reality headset display. For example, a system can be operatively configured such that the movement of a graphical representation of a simulated screwdriver on a computer monitor can correspond to the sensed movement of a control device 10 held by a user 45.

In certain exemplary embodiments, sensory cues can be communicated to a user through the control device's sensory output transducers. The sensory cues can correspond to events in a virtual world. For example, successful unlocking of a door in the virtual world using controlled movement of an avatoy key can result in wireless transmission of light effect sensory cues from the computer control device that specify an RGB color (e.g., red), intensity, and duration corresponding. In certain exemplary embodiments, interactions between an avatoy and another simulated object may correspond to events that result in sensory cues that are communicated to the user through one or more sensory output transducers embedded within or provided as part of the control device 10. As an example and as described elsewhere herein, turning of a simulated key in a simulated door lock through the human-controlled motion of the control device 10 can result in a simulated event of a door opening and a corresponding tactile sensory cue and light effect sensory cues that reinforce the user's success in accomplishing the task.

In certain exemplary embodiments, the control device 10 can be employed in a system that includes a human movement interpretation circuit 202 with one or more sensing transducers (e.g., a human motion capture device 211) operatively configured to sense the kinematic state of the user's arm and hand, and to transmit the kinematic state information to a computing device 120. In certain exemplary embodiments, the human motion capture device 211 can comprise a depth sensor camera and skeletal tracking software. The depth sensor camera can be a Microsoft Kinect™ for Xbox 360™, Microsoft Kinect™ for Xbox One™, a Microsoft Azure Kinect™, or an Intel Realsense™ depth camera. The skeletal tracking software can be a Kinect SDK™ Nuitrack™ Full Body Skeletal Tracking Software, or a Cubemos™ Skeleton Tracking SDK. In alternative embodiments, the human motion capture device 211 can comprise a visible camera and computer vision software to provide equivalent human kinematic state information for the user's arm and hand. The visible camera and computer vision system can be a Meta Quest virtual reality headset, for example.

In certain exemplary embodiments, a system according to the present disclosure includes a control device 10, a valence 170, a touch sensing transducer 205 and/or human motion capture device 211 and a computing device 120, wherein software operable by the computing device 120 and/or the control device 10 incorporates challenges in a computer game for UE therapy involving task ideation, motor planning, motor control, proprioception, gross reaching movements, grasp, fine manipulation, and/or tactile feedback. For example, the control device's sensory output transducers provide visual (e.g., an RGB LED light) and haptic (e.g., vibrotactile) effects optionally synergized with graphical representations provided through the visual display 140. Examples of therapy games employing this system can include a virtual animal or dragon-themed game where feeding the animal or dragon supports practice of UE reaching movements involving the shoulder, elbow, and/or hand. For example, the user can grasp and move the control device 10 to control the movement of a graphical representation of a magic wand that is used to capture dragon food and bring it to the hungry dragon, as shown in FIGS. 13 and 15, for example. User movements to accomplish the tasks of capturing the food and then bringing it to the dragon can require a point-to-point UE reaching. Target positioning for these reaching movements (the food and the dragon) can be designed to elicit specific ranges of motion. The orientation and position of the graphical representation of the wand can correspond to the data provided by the control device's movement interpretation circuit (202 in FIG. 33). The computer game can generate sensory cues (e.g., LED lights and tactile feedback) to provide feedback on the interactions between the wand and other simulated objects. For example, when the user succeeds in using the simulated wand to capture a piece of magical dragon food, the control device's RGB LEDs can light up with the food's color, i.e., so as to match the food's color. When the user successfully moves the captured food to a dragon, the computer game can provide vibrotactile sensor cues and a rainbow cascade of colorful RGB LEDs can pulse through the control device, for example.

In various embodiments, a flight school therapy computer game challenges a user's range of motion in forearm supination. The computer game can interpret the forearm pronation/supination components of the kinematic tracking data provided by a human motion capture device 211 as left-right steering commands controlling a graphical representation of a dragon that is flying through a series of target rings, for example. A user's success in using forearm pronation/supination movement to steer the dragon through a series of targets can be reinforced through sensory cues sent from the computing device to the control device.

To provide sensor measurements from the movement interpretation circuit 202 to the computing device, the control device can send wireless serial data packets, for example, at a rate of 32 Hz. In certain exemplary embodiments, a control device's sensory output transducers can include RGB LEDs. The RGB LEDs can be operatively configured within the control device's atoms and the atoms operatively configured to enclose the RGB LEDs with translucent material, so that light emitted by the LEDs can be seen by a user. In certain exemplary embodiments, the control device 10 is provided with a transceiver module that can wirelessly receive data from the computing device 120, specifying light effect sensory cues to be generated by the LEDs in the control device's atoms. The control device's microcontroller can process these data into commands to a Linear Technology (LTC) 3219 multi-display driver integrated circuit (IC), for example, to achieve a desired color hue and intensity in each of the control device's LEDs. In certain exemplary embodiments, light effect sensory cues can include pulses by one or more of the RGB LEDs of specified number, color, intensity, duration, and inter-pulse delay.

In certain exemplary embodiments, the control device's sensory output transducers can include an eccentric rotating mass (ERM) vibrotactile motor. In certain exemplary embodiments, the vibrotactile motor can be retained and operatively configured within the central hub 12 of the control device 10 such that generated vibrations can be perceived by a user holding any of the atoms or the hub 12. In certain exemplary embodiments, the control device's transceiver module can wirelessly receive data from a computer specifying tactile sensory cues to be generated by the vibrotactile motor. The control device's microcontroller can process these data into commands to a haptic driver IC, for example, to provide electrical current to the vibrotactile motor to achieve a desired vibrotactile effect. In certain exemplary embodiments, tactile sensory cues can include pulses by the vibrotactile motor of specified number, duration, amplitude, and inter-pulse delay.

In certain exemplary embodiments, to provide light effect and tactile sensory cues from the computing device to the control device's microcontroller, the computing device can wirelessly send sensory cue command packets in a specified format. The sensory cue command packet can result, for example, in multiple (e.g., four) RGB LEDs in the control device pulsing multiple times in bright color. In various embodiments, to determine which of the sensory output transducers are affected by the sensory cue command packet, the control device's microcontroller can implement an algorithm.

In various alternative embodiments to those already described, the control device 10 as disclosed herein may include an embedded circuit board comprising a Bosch BMF055™ nine-axis motion sensor module with triaxial 14-bit accelerometer, triaxial 16-bit gyroscope, and triaxial geomagnetic sensor, providing measurement of control device orientation, rotational velocity, and translational acceleration. In various alternative embodiments, the control device's touch detection circuit can use a Microchip™ AT42QT1050 5-channel touch sensor module that is connected to a copper wire loop that follows the contours of an atom's interior. Further, all control device electronics can be fully enclosed within an outer shell constructed of biocompatible ABS-M30i (ISO 10993, USP Class VI) plastic, for example.

The above-described embodiments of the present disclosure may be implemented in accordance with or in conjunction with one or more of a variety of different types of systems, such as, but not limited to, those described below.

The present disclosure contemplates a variety of different systems each having one or more of a plurality of different features, attributes, or characteristics. A "system" as used herein refers to various configurations of: (a) one or more control devices employing one or more circuit boards and/or one or more sensors; (b) one or more computing devices, such as a desktop computer, laptop computer, tablet computer, game computer, personal digital assistant, mobile phone, or other mobile computing device; (c) one or more output devices, such as a display device; (d) one or more control devices communicatively coupled to one or more computing devices; (e) one or more control devices communicatively coupled to one or more output devices, such as a display device; (f) one or more control devices communicatively coupled to one or more computing devices and one or more output devices, such as a display device.

In certain embodiments in which the system includes a computing device in combination with a control device, the computing device includes at least one processor configured to transmit and receive data or signals representing events, messages, commands, or any other suitable information between the computing device and the control device. The processor of the computing device is configured to execute the events, messages, or commands represented by such data or signals in conjunction with the operation of the computing device. Moreover, the processor of the circuit board of the control device is configured to transmit and receive data or signals representing events, messages, commands, or any other suitable information between the control device and the computing device. The processor of the circuit board of the control device is further configured to execute the events, messages, or commands represented by such data or signals in conjunction with the operation of the control device.

In embodiments in which the system includes a computing device configured to communicate with a control device through a data network, the data network is a local area network (LAN), a wide area network (WAN), a public network such as the Internet, or a private network. The control device and the computing device are configured to connect to the data network or remote communications link in any suitable manner. In various embodiments, such a connection is accomplished for the computing device via: a conventional phone line or other data transmission line, a digital subscriber line (DSL), a T-1 line, a coaxial cable, a fiber optic cable, a wireless or wired routing device, a mobile communications network connection (such as a cellular network or mobile Internet network), or any other suitable medium. In various embodiments, such a connection is accomplished for the computing device via a wireless routing device.

It will be appreciated that any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing, including a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented as entirely hardware, entirely software (including firmware, resident software, micro-code, etc.) or as a combined software and hardware implementation, all of which may be generally referred to herein as a "circuit," "module," "component," or "system." Furthermore, aspects of the present disclosure may take the form of a computer program product embodied in one or more computer readable media having computer readable program code embodied thereon.

It will be appreciated that all of the disclosed methods and procedures herein can be implemented using one or more computer programs or components. These components may be provided as a series of computer instructions on any conventional computer-readable medium, including RAM, SATA DOM, or other storage media. The instructions may be configured to be executed by one or more processors which, when executing the series of computer instructions, performs or facilitates the performance of all or part of the disclosed methods and procedures.

Unless otherwise stated, devices or components of the present disclosure that are in communication with each other do not need to be in continuous communication with each other. Further, devices or components in communication with other devices or components can communicate directly or indirectly through one or more intermediate devices, components or other intermediaries. Further, descriptions of embodiments of the present disclosure herein wherein several devices and/or components are described as being in communication with one another does not imply that all such components are required, or that each of the disclosed components must communicate with every other component. In addition, while algorithms, process steps and/or method steps may be described in a sequential order, such approaches can be configured to work in different orders. In other words, any ordering of steps described herein does not, standing alone, dictate that the steps be performed in that order. The steps associated with methods and/or processes as described herein can be performed in any order practical. Additionally, some steps can be performed simultaneously or substantially simultaneously despite being described or implied as occurring non-simultaneously.

It will be appreciated that algorithms, method steps and process steps described herein can be implemented by appropriately programmed computers and computing devices, for example. In this regard, a processor (e.g., a microprocessor or controller device) receives instructions from a memory or like storage device that contains and/or stores the instructions, and the processor executes those instructions, thereby performing a process defined by those instructions.

Computer program code for carrying out operations for aspects of the present disclosure may be written in any combination of one or more programming languages, including an object oriented programming language such as Java, Python, JavaScript, C++, C#, Scala, Smalltalk, Eiffel, JADE, Emerald, VB.NET or the like, conventional procedural programming languages, such as the "C" programming language, Visual Basic, Fortran 2003, Perl, COBOL 2002, PHP, ABAP, dynamic programming languages such as Python, MATLAB, Ruby and Groovy, or other programming languages. The program code may execute entirely on an external computing device, entirely on a control device, as a stand-alone software package, partly on an external computing device and partly on a control device.

Where databases are described or contemplated in the present disclosure, it will be appreciated that various memory structures besides databases may be readily employed. Any drawing figure representations and accompanying descriptions of any exemplary databases presented herein are illustrative and not restrictive arrangements for stored representations of data. Further, any exemplary entries of tables and parameter data represent example information only, and, despite any depiction of the databases as tables, other formats (including relational databases, object-based models and/or distributed databases) can be used to store, process and otherwise manipulate the data types described herein. Electronic storage can be local or remote storage, as will be understood to those skilled in the art. Appropriate encryption and other security methodologies can also be employed by the system of the present disclosure, as will be understood to one of ordinary skill in the art.

Aspects of the present disclosure are described herein with reference to flowchart illustrations and/or block diagrams of methods, apparatuses (e.g., devices and systems) and computer program products according to embodiments of the disclosure. It will be understood that each block of the flowchart illustrations and/or block diagrams, directional arrows between blocks and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The invention claimed is:

1. A system, comprising:
a control device comprising a central hub having a plurality of axes, a first atomic element extending axially outwardly of the central hub on a first of the plurality of axes, and a second atomic element extending axially outwardly of the central hub on the first of the plurality of axes or a second of the plurality of axes, wherein the first atomic element comprises a first atom at an axially outer end of the first atomic element, wherein the second atomic element comprises a second atom at an axially outer end of the second atomic element, wherein the first atom has a first shape and is adapted to be held by a human hand in a first manual grasp modality, and wherein the second atom has a second shape that is different from the first shape and is adapted to be held by a human hand in a second manual grasp modality;
a computing device communicatively coupled to the control device;
a touch detection circuit with a sensing transducer secured within the control device and adapted to sense human grasping of the first and second atoms and transmit a sensed human grasping to the computing device;
wherein the computing device is operable to render a graphical depiction of a first control device simulated object in a virtual world upon receiving a transmission of the sensed human grasping of the first atom from the touch detection circuit; and
wherein the computing device is operable to render a graphical depiction of a second control device simulated object in the virtual world upon receiving a transmission of the sensed human grasping of the second atom from the touch detection circuit, wherein the second control device simulated object is different from the first control device simulated object.

2. The system of claim 1, wherein the control device is untethered with three degrees of rotational freedom and three degrees of translational freedom.

3. The system of claim 1, further comprising a movement interpretation circuit with a sensing transducer secured within the control device and adapted to transmit movement of the control device to the computing device, wherein the computing device is operable to render a graphical depiction of movement of the first control device simulated object in the virtual world after receiving the transmission of the sensed human grasping of the first atom from the touch detection circuit and upon receiving a transmission of movement of the control device from the movement interpretation circuit.

4. The system of claim 3, wherein the computing device is operable to render a graphical depiction of movement of the second control device simulated object in the virtual world after receiving the transmission of the sensed human grasping of the second atom from the touch detection circuit and upon receiving a transmission of movement of the control device from the movement interpretation circuit.

5. The system of claim 3, wherein the control device is operable to generate a sensory output to the first or second atomic elements, upon sensing human grasping of the first or second atoms or receiving a transmission of movement of the control device from the movement interpretation circuit.

6. The system of claim 5, wherein the sensory output is a tactile vibration or an illumination of the first or second atomic elements.

7. The system of claim 3, wherein the computing device is operable to render a graphical depiction of an event in the virtual world after receiving the transmission of the sensed human grasping of the second atom from the touch detection circuit and upon receiving a transmission of movement of the control device from the movement interpretation circuit.

8. The system of claim 7, wherein the graphical depiction of the event comprises a graphical depiction of movement associated with a first simulated object in the virtual world that is different from the first and second control device simulated objects.

9. The system of claim 3, wherein the computing device is operable to render a graphical depiction of an event emanating from the first control device simulated object in the virtual world after receiving the transmission of the sensed human grasping of the second atom from the touch detection circuit.

10. The system of claim 1, wherein the control device further comprises an LED, and wherein the computing device is operable to illuminate the LED simultaneously with the rendering of the graphical depiction of the first control device simulated object in the virtual world.

11. The system of claim 10, wherein the LED is illuminated by the computing device in a color that matches the graphical depiction of the first control device simulated object in the virtual world.

12. A system, comprising:
a control device comprising a central hub having a plurality of axes, a first atomic element extending axially outwardly of the central hub on a first of the plurality of axes, and a second atomic element extending axially outwardly of the central hub on the first of the plurality of axes or a second of the plurality of axes, wherein the first atomic element comprises a first atom at an axially outer end of the first atomic element, wherein the second atomic element comprises a second atom at an axially outer end of the second atomic element, wherein the first atom has a first shape and is adapted to be held by a human hand in a first manual grasp modality, and wherein the second atom has a second shape that is different from the first shape and is adapted to be held by a human hand in a second manual grasp modality;
a computing device communicatively coupled to the control device;
a touch detection circuit with a sensing transducer secured within the control device and adapted to sense human grasping of the first and second atoms and transmit a sensed human grasping to the computing device; and wherein the computing device is operable to render a graphical depiction of a first control device simulated object in a virtual world upon receiving a transmission of the sensed human grasping of the first and second atoms from the touch detection circuit.

13. A system, comprising:
a control device comprising a central hub having a plurality of axes, a first atomic element extending axially outwardly of the central hub on a first of the plurality of axes, and a second atomic element extending axially outwardly of the central hub on the first of the plurality of axes or a second of the plurality of axes, wherein the first atomic element comprises a first atom at an axially outer end of the first atomic element, wherein the second atomic element comprises a second atom at an axially outer end of the second atomic element, wherein the first atom has a first shape and is adapted to be held by a human hand in a first manual grasp modality, and wherein the second atom has a second shape that is different from the first shape and is adapted to be held by a human hand in a second manual grasp modality;
a computing device communicatively coupled to the control device;
a memory communicatively coupled to the computing device, wherein the memory stores a library comprising a plurality of control device simulated objects and a plurality of non-control device simulated objects;
a touch detection circuit with a sensing transducer secured within the control device and adapted to sense human grasping of the first atom and transmit a sensed human grasping to the computing device;
wherein the computing device is operable to, upon receiving a transmission of the sensed human grasping of the first atom from the touch detection circuit, determine a first control device simulated object or a first non-control device simulated object from the library based on the transmission and render a graphical depiction of the determined first control device simulated object or the determined first non-control device simulated object in a virtual world.

14. The system of claim 13, wherein the computing device determines and renders a graphical depiction of the first control device simulated object and the first non-control device simulated object based on the transmission.

15. The system of claim 14, wherein the computing device further determines and renders a graphical depiction of a second non-control device simulated object based on the transmission.

16. The system of claim 13, wherein the touch detection circuit is adapted to sense impact of the control device with a valence and transmit a sensed valence impact to the computing device, and wherein the computing device is operable to, upon receiving a transmission of the sensed valence impact from the touch detection circuit, determine a second non-control device simulated object from the library based on the transmission and render a graphical depiction of the determined second non-control device simulated object in the virtual world.

17. The system of claim 13, wherein the library further comprises a plurality of simulated events, wherein the touch detection circuit is further adapted to sense human grasping of the second atom and transmit a sensed human grasping to the computing device; and
wherein the computing device is operable to, upon receiving a transmission of the sensed human grasping of the second atom from the touch detection circuit, determine a first event from the library and render a graphical depiction of the determined first event in the virtual world.

18. The system of claim 17, wherein the graphical depiction of the determined first event comprises movement of the first non-control device simulated object in the virtual world.

19. The system of claim 18, wherein the graphical depiction of the determined first event further comprises movement of a second non-control device simulated object in the virtual world.

20. The system of claim 13, further comprising a movement interpretation circuit with a sensing transducer secured within the control device and adapted to transmit movement of the control device to the computing device, wherein the computing device is operable to render a graphical depiction of movement of the first control device simulated object in the virtual world after receiving the transmission of the sensed human grasping of the first atom from the touch detection circuit and upon receiving a transmission of movement of the control device from the movement interpretation circuit.

* * * * *